United States Patent
Ikegaya et al.

(10) Patent No.: US 12,194,874 B2
(45) Date of Patent: Jan. 14, 2025

(54) VEHICLE CHARGING SYSTEM

(71) Applicant: Yazaki Corporation, Tokyo (JP)

(72) Inventors: Koji Ikegaya, Shizuoka (JP); Takashi Shiroki, Shizuoka (JP); Yukinari Naganishi, Shizuoka (JP); Suguru Sakamoto, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 527 days.

(21) Appl. No.: 17/723,610

(22) Filed: Apr. 19, 2022

(65) Prior Publication Data

US 2022/0355693 A1 Nov. 10, 2022

(30) Foreign Application Priority Data

May 6, 2021 (JP) ................. 2021-078260

(51) Int. Cl.
| | |
|---|---|
| *B60L 53/37* | (2019.01) |
| *B60L 53/16* | (2019.01) |
| *B60L 53/31* | (2019.01) |
| *G05D 3/12* | (2006.01) |
| *H02J 7/00* | (2006.01) |

(52) U.S. Cl.
CPC ............... *B60L 53/37* (2019.02); *B60L 53/16* (2019.02); *G05D 3/12* (2013.01); *H02J 7/0042* (2013.01); *B60L 53/31* (2019.02)

(58) Field of Classification Search
CPC .......... B60L 53/37; B60L 53/16; H02J 7/0042
USPC .......................................................... 320/109
See application file for complete search history.

(56) References Cited

U.S. PATENT DOCUMENTS

| | | | | |
|---|---|---|---|---|
| 3,596,018 A | * | 7/1971 | Elmes | H01R 13/6315 |
| | | | | D13/133 |
| 5,596,258 A | * | 1/1997 | Kimura | H02J 7/00036 |
| | | | | 320/109 |
| 9,428,070 B2 | * | 8/2016 | Bell | B60L 53/14 |
| 10,351,005 B2 | * | 7/2019 | Haag | H02J 50/90 |
| 11,130,419 B2 | * | 9/2021 | Lin | H02J 50/90 |

(Continued)

FOREIGN PATENT DOCUMENTS

| | | |
|---|---|---|
| EP | 3 805 041 A1 | 4/2021 |
| JP | 2019-209729 A | 12/2019 |

*Primary Examiner* — Jack Chiang
*Assistant Examiner* — Suchin Parihar
(74) *Attorney, Agent, or Firm* — Sughrue Mion, PLLC

(57) ABSTRACT

A power supply device includes a moving unit that moves a power supply fitting body in an insertion-extraction direction, an up-down direction, and a lateral direction that is orthogonal to the insertion-extraction direction and the up-down direction, and a controller that controls the movement of the power supply fitting body by the moving unit. A position detection device moves in linkage with the movement of the power supply fitting body by the moving unit. A power reception fitting body includes first structures extending along the lateral direction and second structures related to a central position of the power reception fitting body in the lateral direction. The first structure and the second structure are formed protruding to one side of the up-down direction with respect to a ceiling surface. The distances between the second structures and the first structures in the insertion-extraction direction are set in advance.

20 Claims, 15 Drawing Sheets

(56) References Cited

U.S. PATENT DOCUMENTS

| | | | |
|---|---|---|---|
| 11,634,046 B2* | 4/2023 | Naganishi | H01R 13/639 |
| | | | 439/76.2 |
| 2018/0154785 A1* | 6/2018 | Wetzel | B60L 53/22 |
| 2019/0184841 A1* | 6/2019 | Van Wiemeersch | B60L 53/66 |
| 2020/0009976 A1* | 1/2020 | Öhman | B60L 53/35 |
| 2020/0101855 A1* | 4/2020 | Lee | G05D 1/0274 |
| 2020/0139820 A1* | 5/2020 | Cole | B60L 53/35 |
| 2021/0086639 A1* | 3/2021 | Rakuff | B60L 53/31 |
| 2021/0347274 A1* | 11/2021 | Kadoko | H02J 7/0042 |
| 2022/0032800 A1* | 2/2022 | Naganishi | B60L 53/14 |
| 2022/0097544 A1* | 3/2022 | Tanaami | H01R 13/6683 |
| 2022/0126718 A1* | 4/2022 | Zhao | B60L 53/66 |
| 2024/0367535 A1* | 11/2024 | Nasr | H02J 50/90 |

* cited by examiner

FIG.16
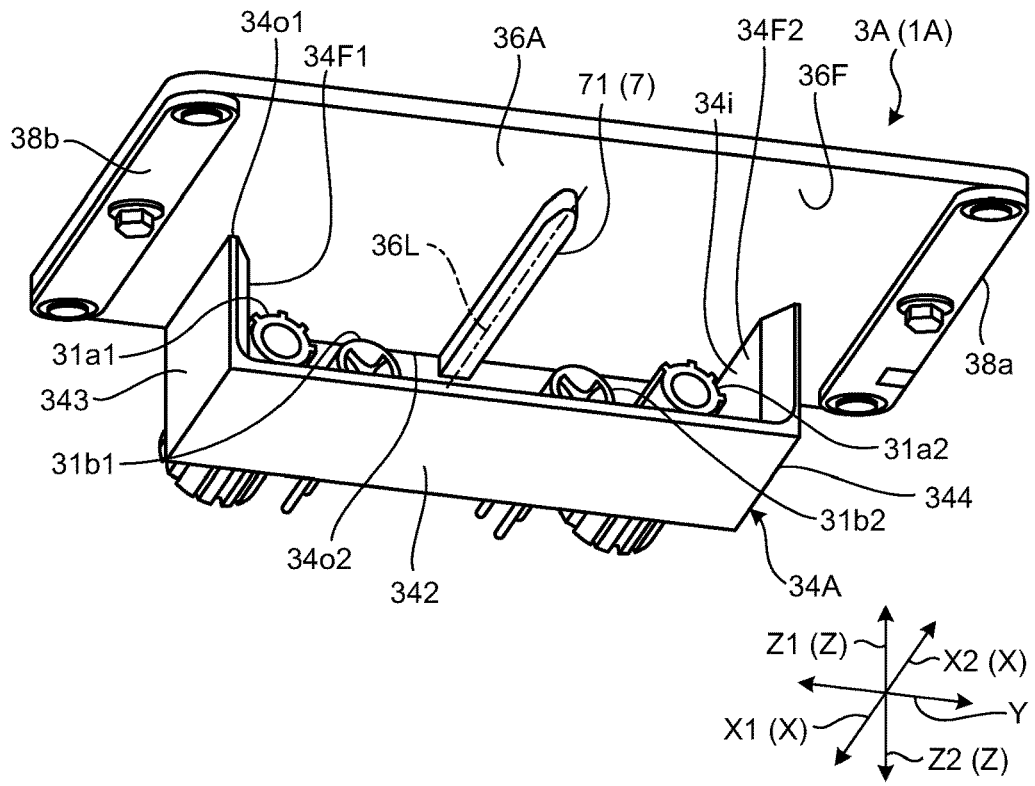
FIG.17
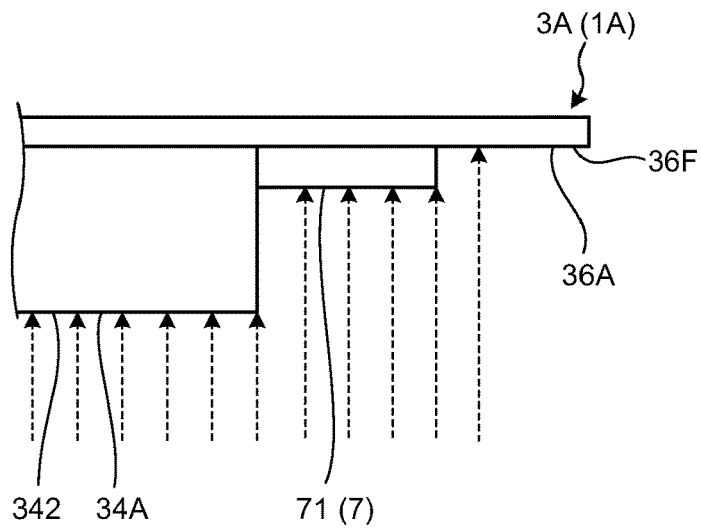
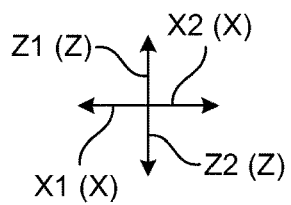

VEHICLE CHARGING SYSTEM

CROSS-REFERENCE TO RELATED APPLICATION(S)

The present application claims priority to and incorporates by reference the entire contents of Japanese Patent Application No. 2021-078260 filed in Japan on May 6, 2021.

BACKGROUND OF THE INVENTION

1. Field of the Invention

The present invention relates to a vehicle charging system.

2. Description of the Related Art

A vehicle with a battery, such as an electric vehicle, runs by driving a driving motor with the power charged in the battery. One of the ways to charge the battery is vehicle charging systems.

One example of the vehicle charging systems includes a power supply device including a power supply fitting body and installed in a stopping space for a vehicle, and a power reception fitting body installed at a bottom part of the vehicle and allowing the power supply fitting body to be inserted thereinto or extracted therefrom (see, for example, Japanese Patent Application Laid-open No. 2019-209729).

The power reception fitting body includes a power reception terminal, and the power supply fitting body includes a power supply terminal that is in contact with the power reception terminal when the power supply fitting body and the power reception fitting body are fitted together. When the power reception terminal and the power supply terminal are electrically connected, power is supplied to the battery from a charging device installed outside the vehicle to charge the battery.

Another example of the conventional vehicle charging devices includes a moving unit that moves a power supply fitting body in an insertion-extraction direction, a lateral direction, and an up-down direction. The moving unit moves the power supply fitting body to insert the power supply fitting body into a power reception fitting body to electrically connect a power reception terminal and a power supply terminal. By this electric connection, power is supplied to a battery from a charging device installed outside a vehicle to charge the battery.

The conventional vehicle charging system may include a plurality of image capturing devices such as cameras in the power supply device and an image processing device that processes images captured by the image capturing devices. By this structure, the power supply fitting body can be moved to be inserted into the power reception fitting body. In the vehicle charging system with such a structure, however, the image capturing devices and the image processing device are expensive and therefore, the high cost may result in a problem.

SUMMARY OF THE INVENTION

The present invention has been made in consideration of the above circumstances, and it is an object to provide a low-cost vehicle charging system.

In order to achieve the above mentioned object, a vehicle charging system according to one aspect of the present invention includes a power supply device including a power supply fitting body and provided in a stopping space for a vehicle; and a power reception fitting body provided at a bottom part of the vehicle and allowing the power supply fitting body to be inserted thereinto or extracted therefrom in an insertion-extraction direction, wherein the power reception fitting body includes a power reception terminal electrically connected to a battery provided to the vehicle, a power reception terminal holding part that holds the power reception terminal, and a power reception ceiling part that includes a ceiling surface and is disposed adjacent to the power reception terminal holding part in the insertion-extraction direction, the power supply fitting body includes a power supply terminal electrically connected to a charging device provided outside the vehicle, the power supply device includes a moving unit that moves the power supply fitting body in the insertion-extraction direction, an up-down direction, and a lateral direction that is orthogonal to the insertion-extraction direction and the up-down direction, and a controller that controls movement of the power supply fitting body by the moving unit, the power reception fitting body includes a first structure extending along the lateral direction and a second structure related to a central position of the power reception fitting body in the lateral direction, the first structure and the second structure are formed protruding to one side of the up-down direction with respect to the ceiling surface, a distance from the second structure to the first structure in the insertion-extraction direction is set in advance, the power supply device includes a position detection device including a light-emitting element that emits detection light to an upward direction along the up-down direction and a light-receiving element that receives the detection light reflected on the power reception fitting body, the position detection device moves in linkage with the movement of the power supply fitting body by the moving unit, the controller performs fitting operation of fitting the power supply fitting body and the power reception fitting body to each other by driving the moving unit, causes the moving unit to move the position detection device in the insertion-extraction direction while the light-emitting element emits the detection light so as to scan the detection light in the insertion-extraction direction and detect the first structure, calculates a position of the second structure in the insertion-extraction direction, based on the detected first structure, causes the moving unit to move the position detection device to the calculated position of the second structure in the insertion-extraction direction, causes the moving unit to move the position detection device in the lateral direction while the light-emitting element emits the detection light so as to scan the detection light in the lateral direction and detect the second structure, calculates the central position of the power reception fitting body in the lateral direction, based on the detected second structure, makes the central position of the power supply fitting body in the lateral direction coincide with the calculated central position of the power reception fitting body in the lateral direction by driving the moving unit, and drives the moving unit to move the power supply fitting body in the upward direction and also in an insertion direction, so that the power supply fitting body and the power reception fitting body are fitted together.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 16 is a perspective view of a power reception fitting body according to a second embodiment;

FIG. 17 is a schematic side view of the power reception fitting body according to the second embodiment;

DETAILED DESCRIPTION OF THE PREFERRED EMBODIMENTS

A vehicle charging system 1 according to an embodiment of the present invention is hereinafter described in detail with reference to the drawings. The present invention is not limited by this embodiment. The components in the following embodiment include the components that can be easily conceived by those skilled in the art or the components that are substantially the same.

Figure 1:
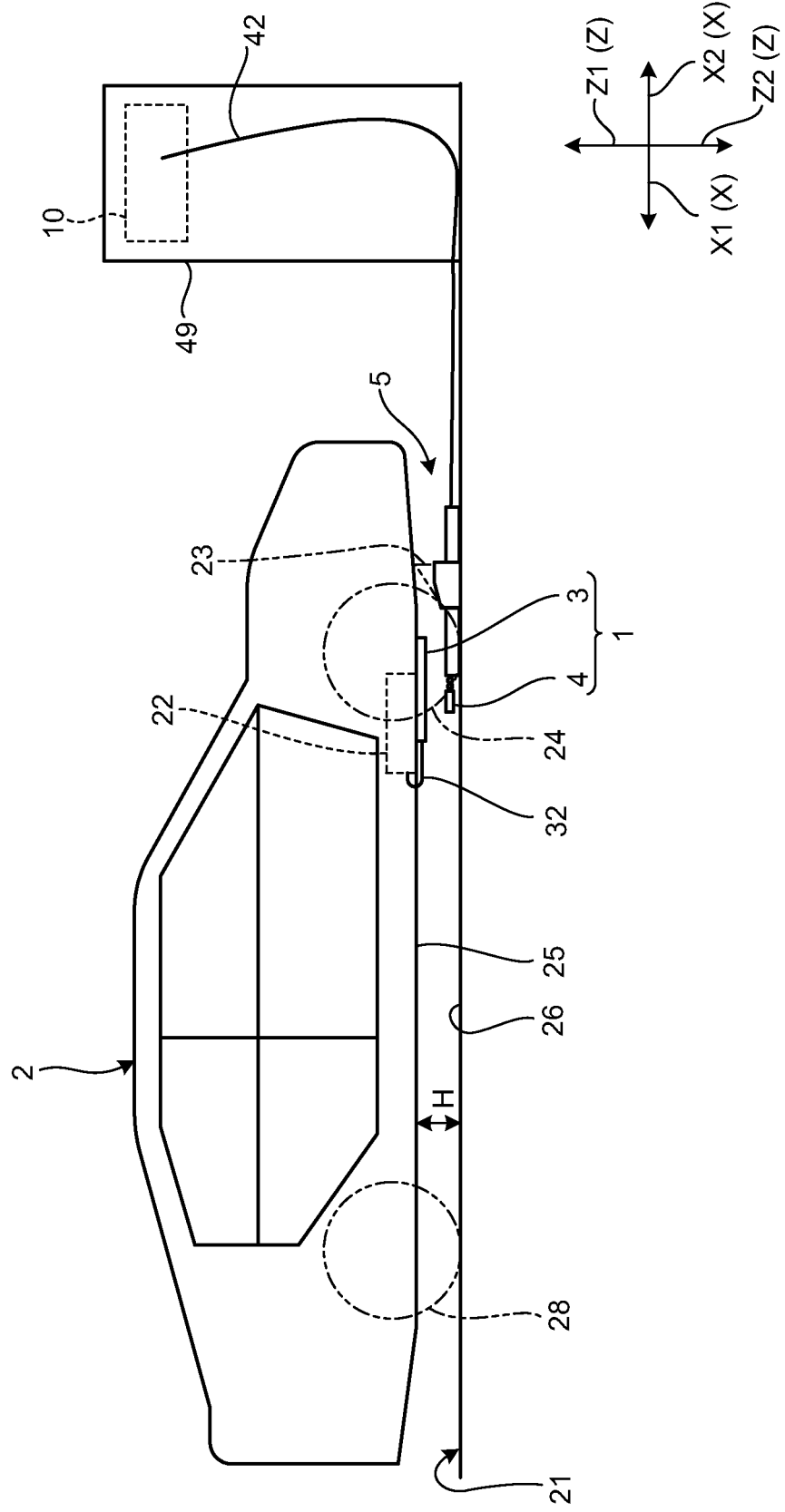
FIG. 1 is a schematic side view of a vehicle charging system according to a first embodiment.
Figure 2:
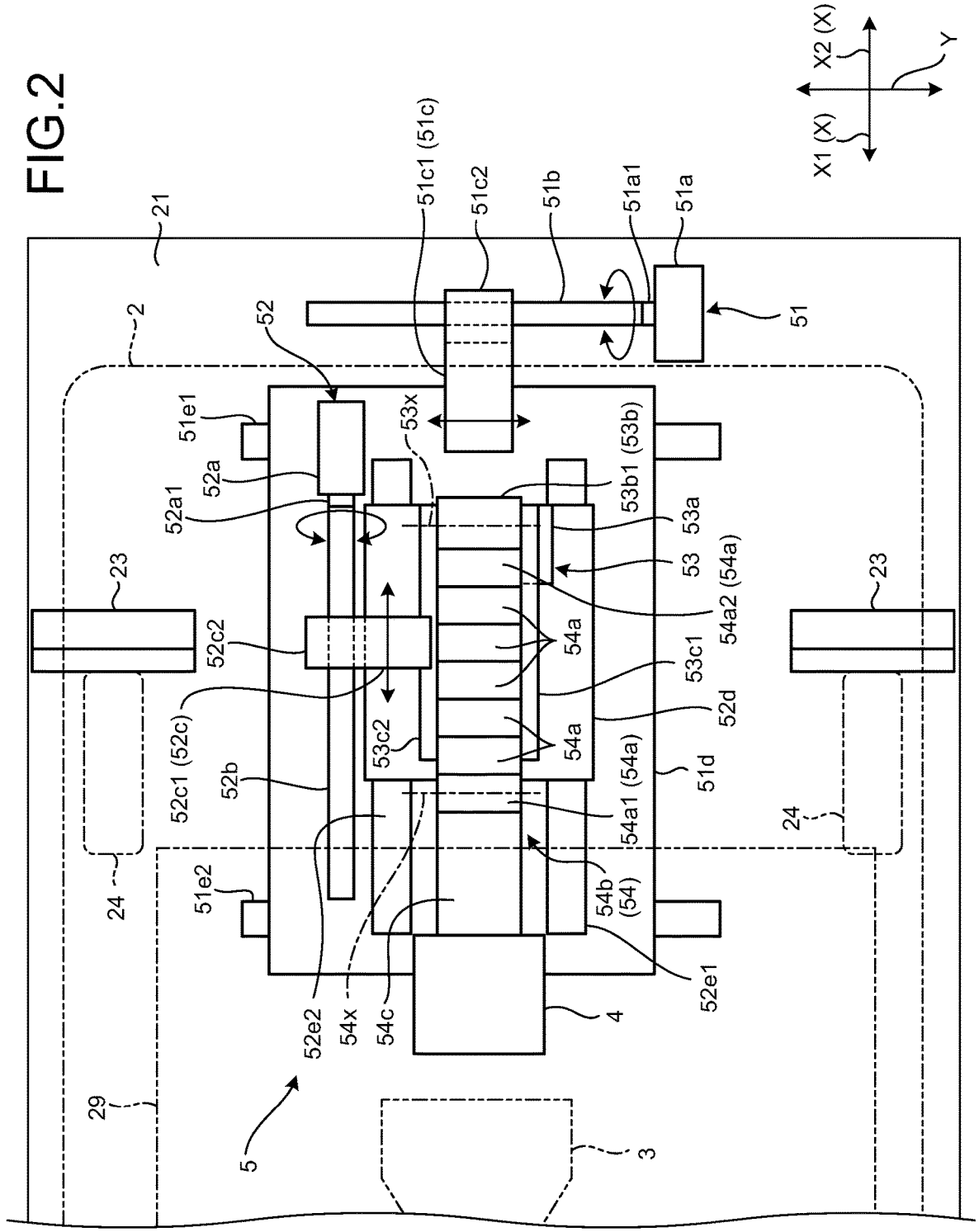
FIG. 2 is a schematic plan view of a moving unit in the vehicle charging system.
Figure 3:
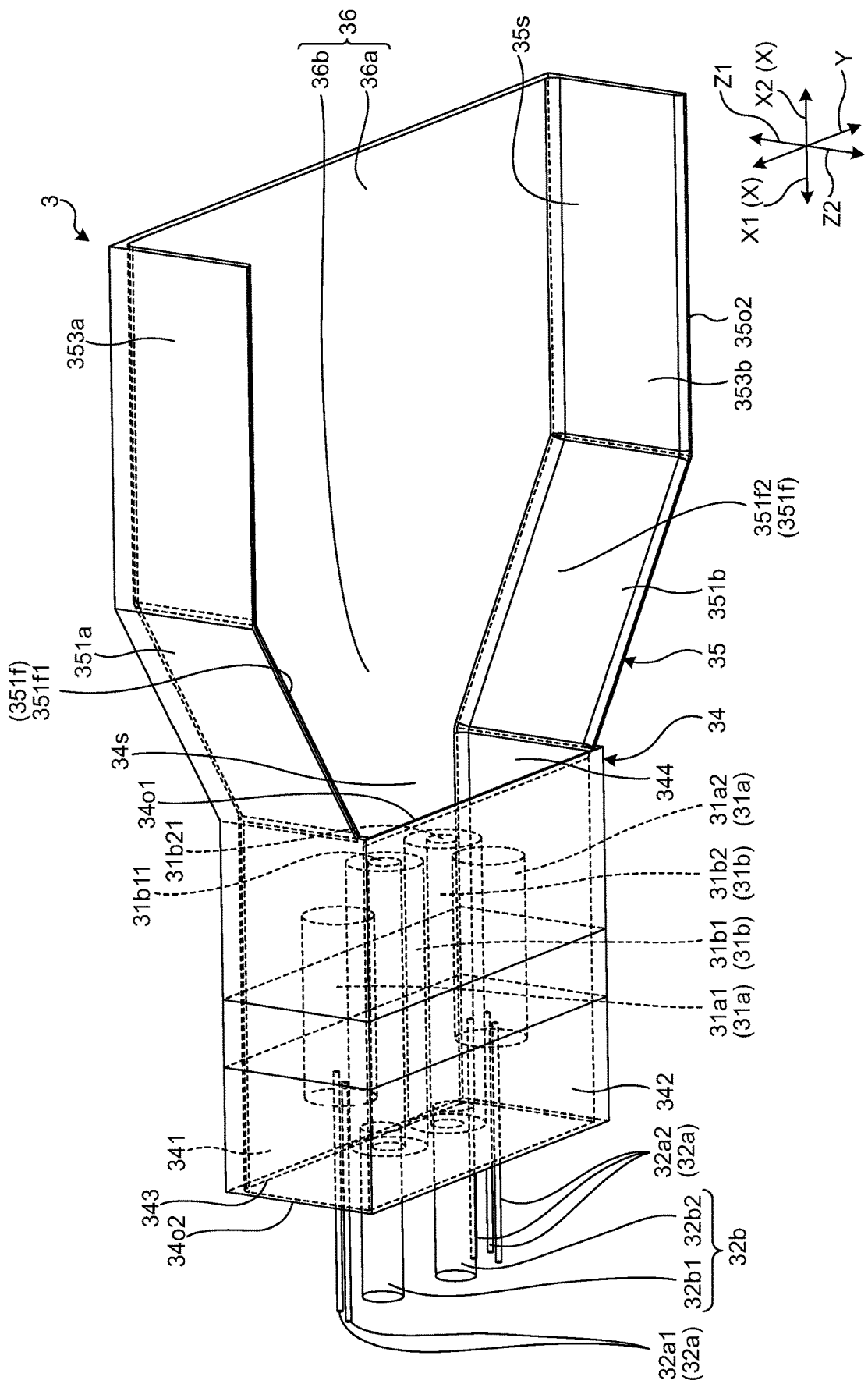
FIG. 3 is a perspective view of a power reception fitting body in the vehicle charging system.
Figure 4:
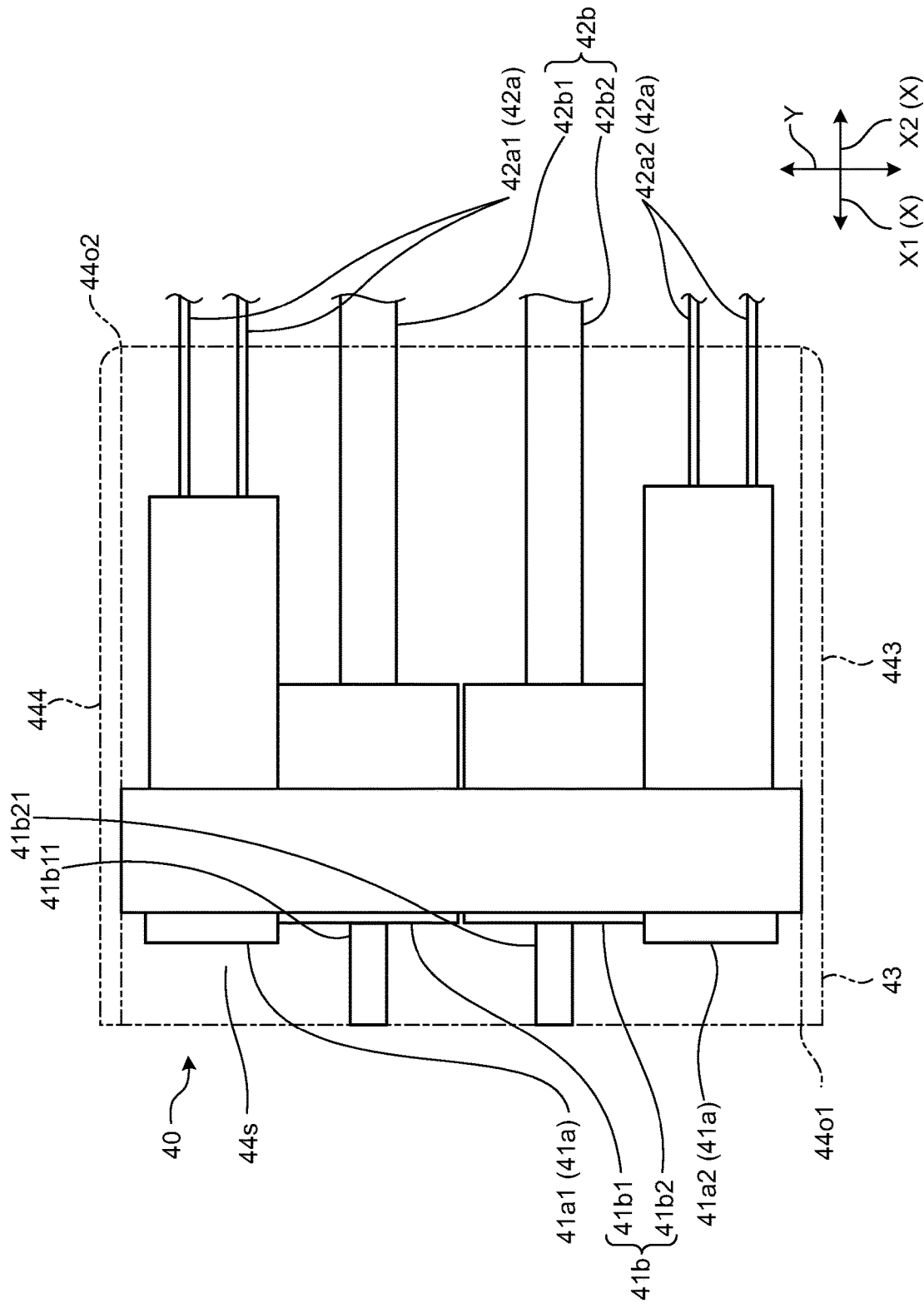
FIG. 4 is a plan view of a power supply fitting body in the vehicle charging system.
Figure 5:
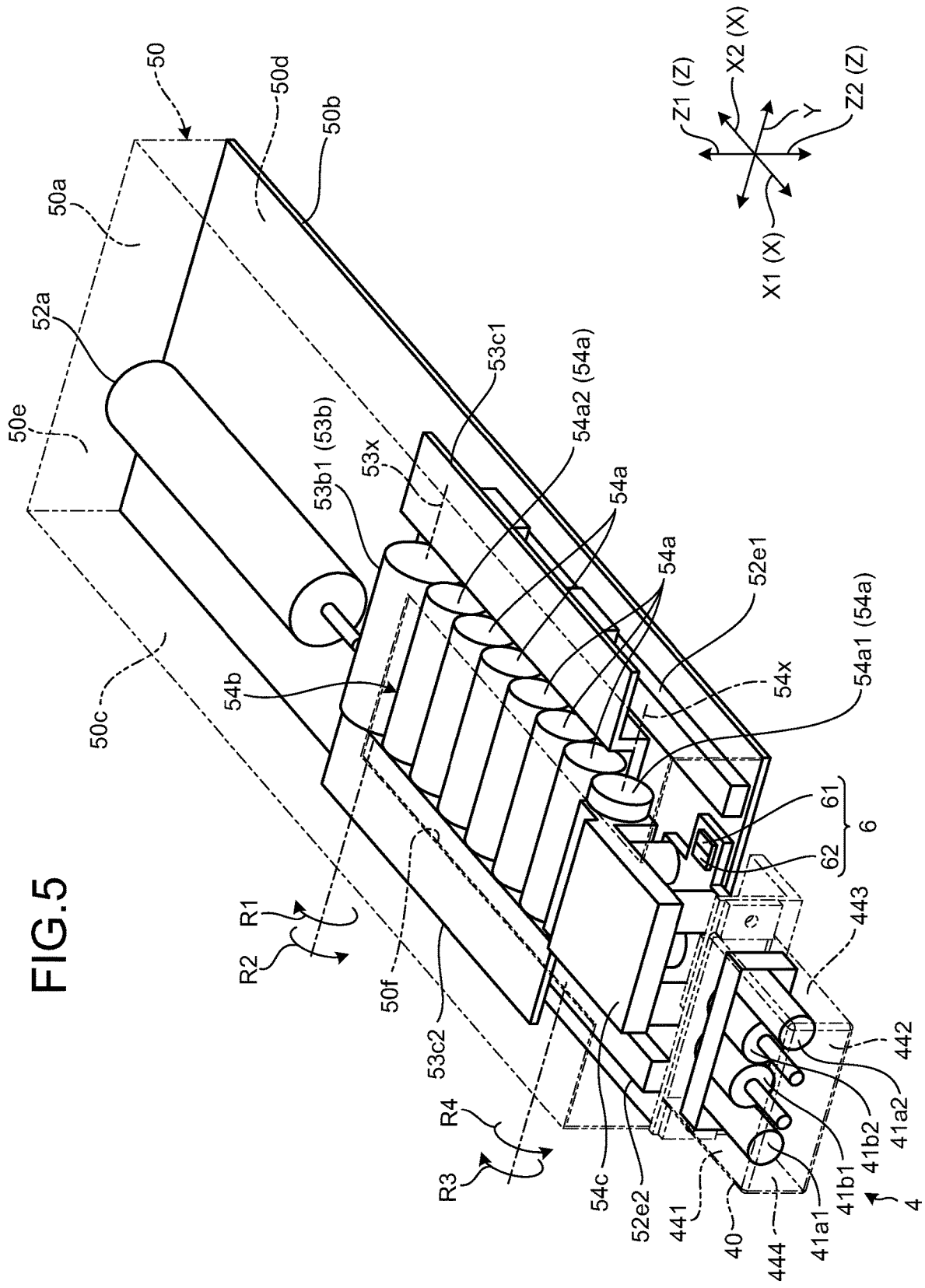
FIG. 5 is a perspective view of the moving unit.
Figure 6:
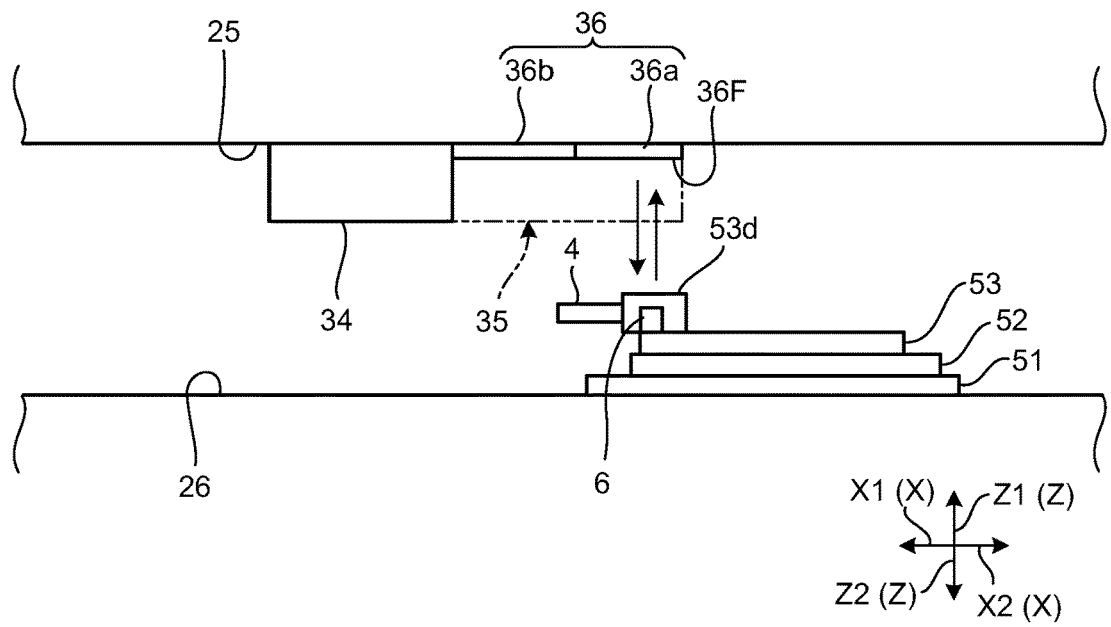
FIG. 6 is a schematic side view of the power reception fitting body and the power supply fitting body.
Figure 7:
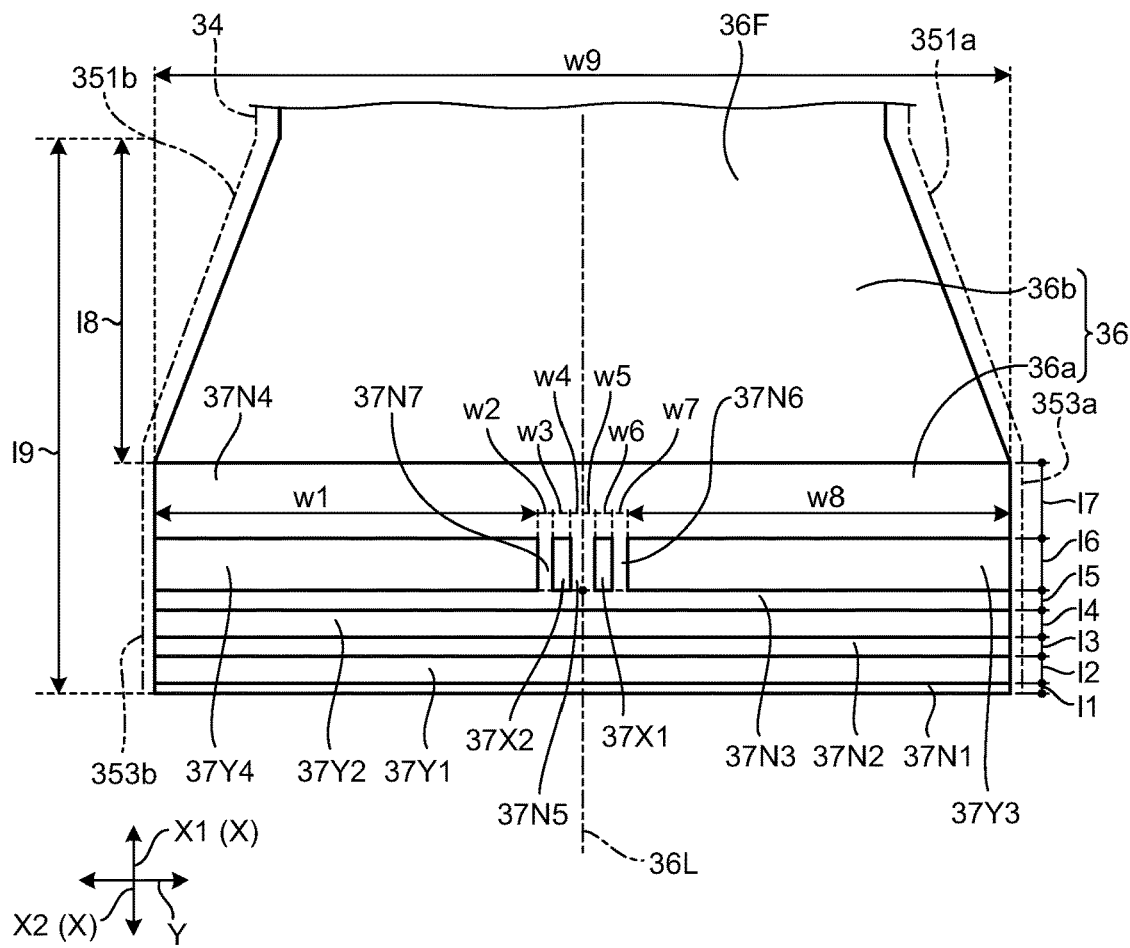
FIG. 7 is a bottom view of a ceiling surface of the power reception fitting body.

FIG. 1 is a side view of the vehicle charging system 1 according to a first embodiment. FIG. 2 is a schematic plan view of a moving unit 5 in the vehicle charging system 1. FIG. 3 is a perspective view of a power reception fitting body 3 in the vehicle charging system 1. FIG. 4 is a plan view of a power supply fitting body 40 in the vehicle charging system 1. FIG. 5 is a perspective view of the moving unit 5. FIG. 6 is a schematic side view of the power reception fitting body 3 and the power supply fitting body 40. FIG. 7 is a bottom view of a ceiling surface 36F of the power reception fitting body 3.

In FIG. 1 to FIG. 7, X indicates an insertion-extraction direction of the vehicle charging system 1, X1 indicates a fitting direction, which is one direction along the insertion-extraction direction X, and X2 indicates an extraction direction, which is the other direction along the insertion-extraction direction X. In other words, the extraction direction X2 is the direction opposite to the insertion direction X1 along the insertion-extraction direction X. Y indicates a direction orthogonal to the insertion-extraction direction X of the vehicle charging system 1. Z indicates an up-down direction Z of the vehicle charging system 1. Z1 is an upward direction, which is one direction along the up-down direction Z, and Z2 is a downward direction, which is the other direction along the up-down direction Z. In other words, the downward direction Z2 is the direction opposite to the upward direction Z1 along the up-down direction Z. In the vehicle charging system 1 according to the present embodiment, the insertion-extraction direction X, a lateral direction Y, and the up-down direction Z are orthogonal to each other. In the vehicle charging system 1 according to the first embodiment, the insertion-extraction direction X of the vehicle charging system 1 coincides with a front-rear direction of a vehicle 2 in a stop state, and the lateral direction Y of the vehicle charging system 1 coincides with a width direction of the stopped vehicle 2 as illustrated in FIG. 1.

First Embodiment

The vehicle charging system 1 according to the present embodiment illustrated in FIG. 1 and FIG. 2 includes the power reception fitting body (power reception device) 3 and a power supply device 4. The power supply device 4 includes the power supply fitting body 40 and is installed in, for example, a stopping space 21 for the vehicle 2.

The vehicle 2 uses the electric power supplied from a battery 22, which is a storage battery that can be charged and discharged, to drive an electric motor (motor), and runs using the electric motor as a part or all of the motive power source. The vehicle 2 is, for example, an electric vehicle, a hybrid vehicle, a plug-in hybrid vehicle, etc. The vehicle 2 is parked with front wheels 24 in contact with a stopper 23 in the stopping space 21 where the power supply device 4 is installed. The battery 22 is electrically connected to a charging device 49 connected to the power supply device 4 by the fitting between the power supply fitting body 40 and the power reception fitting body 3, and is charged by the power supplied from the charging device 49. When the power supply fitting body 40 and the power reception fitting body 3 are fitted together, power supply power terminals 41b are electrically connected to power reception power terminals 31b. The vehicle 2 has what is called a minimum ground clearance H between a bottom part 25 of the vehicle 2 and a ground surface 26 in the up-down direction Z of the vehicle 2. The bottom part 25 is the lowest part of the vehicle 2 in the up-down direction Z between the front wheels 24 and rear wheels 28 of the vehicle 2. The minimum ground clearance H should be 9 cm or more in the safety regulations for road vehicles. The vehicle 2 with the vehicle charging system 1 according to the present embodiment runs and stops according to the driving operation of an occupant.

The power reception fitting body 3 is what is called an inlet and is located at the bottom part 25 of the vehicle 2. The power supply fitting body 40 can be fitted to and extracted from the power reception fitting body 3. The power reception fitting body 3 in the present embodiment is, for example, located at a central part of the vehicle 2 in the lateral direction Y in a concave part extending in the front-rear direction with respect to the vehicle body. More specifically, the entire power reception fitting body 3 is placed inside the concave part. The power reception fitting body 3 includes the power reception power terminals (power reception terminals) 31b, power reception signal terminals 31a, a power reception terminal holding part 34, an opposing space formation part 35, and a power reception ceiling part 36 as illustrated in FIG. 3.

The power reception power terminal 31b is formed of conductive metal in a cylindrical tubular shape, extending in the insertion-extraction direction X. The power reception power terminal 31b is electrically connected to the battery 22 installed in the vehicle 2. The power reception power terminal 31b is thicker in the radial direction than the power reception signal terminal 31a in the radial direction. The power reception power terminals 31b include, for example, a first power reception power terminal 31b1 and a second power reception power terminal 31b2. In other words, the power reception fitting body 3 in the present embodiment includes the two power reception power terminals 31b. The power reception power terminals 31b are electrically connected to ends of respective power reception power wires 32b. The power reception power wires 32b include a first power reception power wire 32b1 and a second power reception power wire 32b2. The first power reception power terminal 31b1 is electrically connected to the end of the first power reception power wire 32b1. The second power reception power terminal 31b2 is electrically connected to the end of the second power reception power wire 32b2.

The power reception power terminals 31b and the power reception power wires 32b are installed in the middle of the power supply line that supplies power from the charging device 49 to the battery 22.

An engagement concave part 31b11 is formed at the tip of the first power reception power terminal 31b1. The engagement concave part 31b11 extends from the tip of the first power reception power terminal 31b1 in the insertion direction X1. An engagement concave part 31b21 is formed at the tip of the second power reception power terminal 31b2. The engagement concave part 31b21 extends from the tip of the second power reception power terminal 31b2 in the insertion direction X1.

The power reception signal terminal 31a is formed of conductive metal in a cylindrical columnar shape, extending along the insertion-extraction direction X. The power reception signal terminals 31a, for example, include a first power reception signal terminal 31a1 and a second power reception signal terminal 31a2. In other words, the power reception fitting body 3 in the present embodiment includes the two power reception signal terminals 31a. The power reception signal terminals 31a are electrically connected to ends of respective power reception signal wires 32a. The power reception signal wires 32a include a first power reception signal wire 32a1 and a second power reception signal wire 32a2. The first power reception signal terminal 31a1 is electrically connected to the end of the first power reception signal wire 32a1. The second power reception signal terminal 31a2 is electrically connected to the end of the second power reception signal wire 32a2.

The power reception signal terminal 31a and the power reception signal wire 32a are provided in the middle of the signal line where signals are exchanged between the charging device 49 and the battery 22. The signals are related to the status of the battery 22, for example, the fill rate of the battery 22.

The power reception fitting body 3 includes the (two) power reception power terminals 31b arranged in the lateral direction Y. In addition to the (two) power reception power terminals 31b, the power reception fitting body 3 includes the (two) power reception signal terminals 31a arranged in the lateral direction Y on the sides of both the power reception power terminals 31b in the lateral direction Y. In other words, the power reception fitting body 3 in the present embodiment includes the two power reception power terminals 31b arranged adjacent to each other in the lateral direction Y, and the two power reception signal terminals 31a arranged adjacent to those power reception power terminals 31b on both sides in the lateral direction Y.

The power reception terminal holding part 34 is formed of synthetic resin having an insulating property. The power reception terminal holding part 34 houses and holds the power reception power terminals 31b and the power reception signal terminals 31a. The power reception terminal holding part 34 is formed in a rectangular tubular shape with a pair of first power reception facing parts 341 and 342 facing each other in the up-down direction Z, and a pair of second power reception facing parts 343 and 344 facing each other in the lateral direction Y. The power reception terminal holding part 34 has an internal space 34s formed by the pair of first power reception facing parts 341 and 342, and the pair of second power reception facing parts 343 and 344. The power reception terminal holding part 34 has a first holding part opening 34o1 at an end part on the extraction direction X2 side. The first holding part opening 34o1 connects between the internal space 34s of the power reception terminal holding part 34 and an opposing space 35s described later. The first holding part opening 34o1 is then used to insert and extract the power supply fitting body 40 along the insertion-extraction direction X. Furthermore, the power reception terminal holding part 34 includes a second holding part opening 34o2 at an end part of the power reception power terminal 31b on the insertion direction X1 side. The second holding part opening 34o2 connects between the internal space 34s of the power reception terminal holding part 34, and the outside. Through the second holding part opening 34o2, the power reception power wires 32b and the power reception signal wires 32a are inserted.

The opposing space formation part 35 is formed of synthetic resin with an insulation property. In the power reception fitting body 3 in the present embodiment, the power reception terminal holding part 34 and the opposing space formation part 35 are formed integrally. The opposing space formation part 35 is located adjacent to the power reception terminal holding part 34 in the insertion-extraction direction X, and forms the opposing space 35s facing the power reception power terminal 31b. The opposing space formation part 35 includes a pair of third power reception facing parts 351a and 351b facing each other in the lateral direction Y, a pair of fourth facing parts 353a and 353b facing each other in the lateral direction Y, and a power reception ceiling part 36 connecting between upper end parts of the pair of third power reception facing parts 351a and 351b and connecting between upper end parts of the pair of fourth facing parts 353a and 353b. The opposing space formation part 35 forms the opposing space 35s on the extraction direction X2 side of the power reception power terminal 31b by the pair of third power reception facing parts 351a and 351b, the pair of fourth facing parts 353a and 353b, and the power reception ceiling part 36. Additionally, the opposing space formation part 35 includes a formation part opening 35o2 that connects between the opposing space 35s and the outside by end parts of the pair of third power reception facing parts 351a and 351b in the downward direction Z2 and end parts of the pair of fourth facing parts 353a and 353b in the downward direction Z2.

The pair of third power reception facing parts 351a and 351b are inclined with respect to the insertion-extraction direction X and the lateral direction Y. The distance between the end parts of the third power reception facing parts 351a and 351b on the insertion direction X1 side in the insertion-extraction direction X is smaller than the distance between the end parts on the extraction direction X2 side in the insertion-extraction direction X. In other words, the distance between the pair of third power reception facing parts 351a and 351b in the lateral direction Y increases toward the extraction direction X2.

Guide surfaces 351f are placed on the opposing space 35s (inner surface) side of the pair of third power reception facing parts 351a and 351b. The guide surface 351f in the present embodiment is located on the extraction direction X2 side of the power reception terminal holding part 34. The guide surfaces 351f are arranged as a pair with the power reception terminal holding part 34 held therebetween in the lateral direction Y. The distance between a pair of guide surfaces 351f1 and 351f2 in the lateral direction Y becomes narrower toward the insertion direction X1 side in the insertion-extraction direction X. The pair of fourth facing parts 353a and 353b are arranged in parallel to each other in the lateral direction Y.

The power reception ceiling part 36 is located adjacent to the power reception terminal holding part 34 in the insertion-extraction direction X. The power reception ceiling part 36 is formed in a thin plate shape and includes a first ceiling part 36a located between the pair of fourth facing parts 353a and 353b in the lateral direction Y, and a second ceiling part 36b located between the pair of third power reception facing parts 351a and 351b in the lateral direction Y. The first ceiling part 36a is formed in a rectangular shape when viewed from the up-down direction Z. The first ceiling part 36a is formed in a long rectangular shape when viewed from the up-down direction Z. The second ceiling part 36b is formed in an isosceles trapezoidal shape when viewed from the up-down direction Z.

In the vehicle charging system 1 according to the present embodiment, for example, when the vehicle 2 running in autonomous operation stops, a controller 10, which is described later, drives the moving unit 5 to bring the power supply fitting body 40 into contact with the power reception ceiling part 36.

The power reception ceiling part 36 illustrated in FIG. 6 and FIG. 7 includes a plurality of grooves 37 on the ceiling surface 36F, which is a lower surface in the up-down direction Z. More specifically, the grooves 37 are disposed on the ceiling surface 36F of the first ceiling part 36a in the power reception ceiling part 36. The ceiling surface 36F in the power reception ceiling part 36 is formed flat except for the grooves 37. The depth of a bottom part of each groove 37 with respect to the ceiling surface 36F is less than or equal to the thickness of the ceiling surface 36F in the up-down direction Z. In other words, the grooves 37 are formed protruding in the upward direction Z1 of the up-down direction Z with respect to the ceiling surface 36F.

The grooves 37 include lateral-direction extension grooves 37Y extending in the lateral direction Y, and insertion-extraction-direction extension grooves 37X extending in the insertion-extraction direction X. The lateral-direction extension grooves 37Y include a first lateral-direction extension groove 37Y1, a second lateral-direction extension groove 37Y2, a third lateral-direction extension groove 37Y3, and a fourth lateral-direction extension groove 37Y4. The insertion-extraction-direction extension grooves 37X include a first insertion-extraction-direction extension groove 37X1 and a second insertion-extraction-direction extension groove 37X2.

The first lateral-direction extension groove 37Y1 is disposed on the most extraction direction X2 side among the grooves 37 in the insertion-extraction direction X. The first lateral-direction extension groove 37Y1 is disposed adjacent to the extraction direction X2 side of a first groove non-formation area 37N1 where the grooves 37 are not formed. The first lateral-direction extension groove 37Y1 extends from one fourth facing part 353a of the pair of fourth facing parts 353a and 353b to the other fourth facing part 353b. The first lateral-direction extension groove 37Y1 is provided across an axis line 36L bisecting the power reception ceiling part 36 in the lateral direction Y and is formed symmetrically with respect to the axis line 36L. The axis line 36L is at a central position of the power reception fitting body 3 in the lateral direction Y.

The second lateral-direction extension groove 37Y2 is located on the extraction direction X2 side after the first lateral-direction extension groove 37Y1 among the grooves 37 in the insertion-extraction direction X. The second lateral-direction extension groove 37Y2 is disposed adjacent to the insertion direction X1 side of a second groove non-formation area 37N2 where the grooves 37 are not formed and adjacent to the extraction direction X2 side of a third groove non-formation area 37N3 where the grooves 37 are not formed. In other words, the second lateral-direction extension groove 37Y2 is located between the first lateral-direction extension groove 37Y1, and the third lateral-direction extension groove 37Y3, the fourth lateral-direction extension groove 37Y4, the first insertion-extraction-direction extension groove 37X1, and the second insertion-extraction-direction extension groove 37X2 in the insertion-extraction direction X. Furthermore, the width of the second lateral-direction extension groove 37Y2 is the same as the width of the first lateral-direction extension groove 37Y1. The second lateral-direction extension groove 37Y2 extends from one fourth facing part 353a of the pair of fourth facing parts 353a and 353b to the other fourth facing part 353b. The second lateral-direction extension groove 37Y2 is provided across the axis line 36L bisecting the power reception ceiling part 36 in the lateral direction Y and is formed symmetrically with respect to the axis line 36L.

The third lateral-direction extension groove 37Y3, the fourth lateral-direction extension groove 37Y4, the first insertion-extraction-direction extension groove 37X1, and the second insertion-extraction-direction extension groove 37X2 are disposed linearly along the lateral direction Y. The third lateral-direction extension groove 37Y3, the fourth lateral-direction extension groove 37Y4, the first insertion-extraction-direction extension groove 37X1, and the second insertion-extraction-direction extension groove 37X2 are disposed on the most insertion direction X1 side among the grooves 37 in the insertion-extraction direction X. The third lateral-direction extension groove 37Y3, the fourth lateral-direction extension groove 37Y4, the first insertion-extraction-direction extension groove 37X1, and the second insertion-extraction-direction extension groove 37X2 are disposed adjacent to the insertion direction X1 side of the third groove non-formation area 37N3. The third lateral-direction extension groove 37Y3, the fourth lateral-direction extension groove 37Y4, the first insertion-extraction-direction extension groove 37X1, and the second insertion-extraction-direction extension groove 37X2 are disposed adjacent to the extraction direction X2 side of a fourth groove non-formation area 37N4 where the grooves 37 are not formed. Furthermore, the width of the third lateral-direction extension groove 37Y3 is the same as the width of the fourth lateral-direction extension groove 37Y4. Additionally, the width of the third lateral-direction extension groove 37Y3 is larger than the width of the second lateral-direction extension groove 37Y2.

The third lateral-direction extension groove 37Y3 and the fourth lateral-direction extension groove 37Y4 are disposed symmetrically with respect to the axis line 36L. In addition, the first insertion-extraction-direction extension groove 37X1 and the second insertion-extraction-direction extension groove 37X2 are disposed symmetrically with respect to the axis line 36L.

The third lateral-direction extension groove 37Y3 and the first insertion-extraction-direction extension groove 37X1 are located between the axis line 36L and one fourth facing part 353a. Of the third lateral-direction extension groove 37Y3 and the first insertion-extraction-direction extension groove 37X1, the third lateral-direction extension groove 37Y3 is arranged apart from the axis line 36L in the lateral direction Y and the first insertion-extraction-direction extension groove 37X1 is arranged close to the axis line 36L in the lateral direction Y.

The fourth lateral-direction extension groove 37Y4 and the second insertion-extraction-direction extension groove 37X2 are located between the axis line 36L and the other fourth facing part 353b. Of the fourth lateral-direction extension groove 37Y4 and the second insertion-extraction-direction extension groove 37X2, the fourth lateral-direction extension groove 37Y4 is arranged apart from the axis line 36L in the lateral direction Y and the second insertion-extraction-direction extension groove 37X2 is arranged close to the axis line 36L in the lateral direction Y.

The ceiling surface 36F of the first ceiling part 36a includes a fifth groove non-formation area 37N5 where the grooves 37 are not formed between the first insertion-extraction-direction extension groove 37X1 and the second insertion-extraction-direction extension groove 37X2 in the lateral direction Y. The fifth groove non-formation area 37N5 includes a part of the axis line 36L.

The ceiling surface 36F of the first ceiling part 36a includes a sixth groove non-formation area 37N6 where the grooves 37 are not formed between the first insertion-extraction-direction extension groove 37X1 and the third lateral-direction extension groove 37Y3 in the lateral direction Y.

The ceiling surface 36F of the first ceiling part 36a includes a seventh groove non-formation area 37N7 where the grooves 37 are not formed between the second insertion-extraction-direction extension groove 37X2 and the fourth lateral-direction extension groove 37Y4 in the lateral direction Y.

The ceiling surface 36F of the first ceiling part 36a includes the fourth groove non-formation area 37N4 where the grooves 37 are not formed, between the second ceiling part 36b, and the third lateral-direction extension groove 37Y3, the fourth lateral-direction extension groove 37Y4, the first insertion-extraction-direction extension groove 37X1, the second insertion-extraction-direction extension groove 37X2, the fifth groove non-formation area 37N5, the sixth groove non-formation area 37N6, and the seventh groove non-formation area 37N7 in the insertion-extraction direction X.

The first lateral-direction extension groove 37Y1 and the second lateral-direction extension groove 37Y2 are first structures that extend along the lateral direction Y. The first insertion-extraction-direction extension groove 37X1, the second insertion-extraction-direction extension groove 37X2, the third lateral-direction extension groove 37Y3, and the fourth lateral-direction extension groove 37Y4 are second structures associated with the central position of the power reception fitting body 3. Regarding the second structures in the present embodiment, the first insertion-extraction-direction extension groove 37X1 and the second insertion-extraction-direction extension groove 37X2, which have the same length in the lateral direction Y, are arranged line-symmetrically with respect to the axis line 36L, and the third lateral-direction extension groove 37Y3 and the fourth lateral-direction extension groove 37Y4, which have the same length in the lateral direction Y, are arranged line-symmetrically with respect to the axis line 36L. The axis line 36L is at the central position of the power reception fitting body 3 in the lateral direction Y. The distance from the second structure to the first structure in the insertion-extraction direction X is set in advance. The unevenness caused by the first lateral-direction extension groove 37Y1, the second lateral-direction extension groove 37Y2, the third lateral-direction extension groove 37Y3, the fourth lateral-direction extension groove 37Y4, the first insertion-extraction-direction extension groove 37X1, and the second insertion-extraction-direction extension groove 37X2 on the ceiling surface 36F is not formed on the bottom part 25 of the vehicle 2 except for the ceiling surface 36F.

The length of the first lateral-direction extension groove 37Y1 in the lateral direction Y and the length of the second lateral-direction extension groove 37Y2 in the lateral direction Y are the same, and this length is w9.

The length of the first groove non-formation area 37N1 in the lateral direction Y, the length of the second groove non-formation area 37N2 in the lateral direction Y, the length of the third groove non-formation area 37N3 in the lateral direction Y, the length of the fourth groove non-formation area 37N4 in the lateral direction Y, and the length of an eighth groove non-formation area 37N8 in the lateral direction Y are the same, and this length is w9. For example, the length w9 is 260 mm.

The length of the third lateral-direction extension groove 37Y3 in the lateral direction Y is w8, and the length of the fourth lateral-direction extension groove 37Y4 in the lateral direction Y is w1. The length w1 and the length w8 are the same.

The length of the sixth groove non-formation area 37N6 in the lateral direction Y is w7, and the length of the seventh groove non-formation area 37N7 in the lateral direction Y is w2. The length w2 and the length w7 are the same.

The length of the first insertion-extraction-direction extension groove 37X1 in the lateral direction Y is w6, and the length of the second insertion-extraction-direction extension groove 37X2 in the lateral direction Y is w3. The length w3 and the length w6 are the same.

The distance in the lateral direction Y between the first insertion-extraction-direction extension groove 37X1 and the axis line 36L is w5, and the distance in the lateral direction Y between the second insertion-extraction-direction extension groove 37X2 and the axis line 36L is w4. The distance w4 and the distance w5 are the same.

The length of the first lateral-direction extension groove 37Y1 in the insertion-extraction direction X is l2, and the length of the second lateral-direction extension groove 37Y2 in the insertion-extraction direction X is l4. The length l2 and the length l4 are the same.

The length of the first groove non-formation area 37N1 in the insertion-extraction direction X is l1, and the length l1 is shorter than the length l2.

The length of the second groove non-formation area 37N2 in the insertion-extraction direction is 13, and the length of the third groove non-formation area 37N3 in the insertion-extraction direction X is 15. The length 13 and the length 15 are the same. The length 13 is shorter than the length 12.

The length of the third lateral-direction extension groove 37Y3 in the insertion-extraction direction X and the length of the fourth lateral-direction extension groove 37Y4 in the insertion-extraction direction X are the same, and this length is 16.

The length of the first insertion-extraction-direction extension groove 37X1 in the insertion-extraction direction X and the length of the second insertion-extraction-direction extension groove 37X2 in the insertion-extraction direction X are the same, and this length is 16.

The length of the fifth groove non-formation area 37N5 in the insertion-extraction direction X, the length of the sixth groove non-formation area 37N6 in the insertion-extraction direction X, and the length of the seventh groove non-formation area 37N7 in the insertion-extraction direction X are the same.
This length is 16.

The length of the fourth groove non-formation area 37N4 in the insertion-extraction direction X is 17. The length 17 is longer than any of the lengths 11 to 16.

The length of the first ceiling part 36a in the insertion-extraction direction X is 17 and the length of the second ceiling part 36b in the insertion-extraction direction X is 18. The length 18 is, for example, 105 to 125 mm, and the length 19 is, for example, 155 to 175 mm.

The length w9, which is the length of the first lateral-direction extension groove 37Y1 along the lateral direction Y and the length of the second lateral-direction extension groove 37Y2 along the lateral direction Y, is longer than the length 16, which is the length of the first insertion-extraction-direction extension groove 37X1 along the insertion-extraction direction and the length of the second insertion-extraction-direction extension groove 37X2 along the insertion-extraction direction. In addition, the length w9, which is the length of the first lateral-direction extension groove 37Y1 along the lateral direction Y and the length of the second lateral-direction extension groove 37Y2 along the lateral direction Y, is longer than the length 16, which is the length of the third lateral-direction extension groove 37Y3 along the insertion-extraction direction and the length of the fourth lateral-direction extension groove 37Y4 along the insertion-extraction direction. In other words, in the vehicle charging system 1 according to the present embodiment, the length of the first structure along the insertion-extraction direction X is longer than the length of the second structure along the insertion-extraction direction. Then, as described below, the vehicle charging system 1 according to the present embodiment detects the first structure first by a position detection device 6 and the second structure later by the position detection device 6.

In the present embodiment, a plurality of the first structures are arranged along the insertion-extraction direction X at the ceiling surface 36F. In the present embodiment, a plurality of the second structures are arranged along the lateral direction Y at the ceiling surface 36F.

The power supply device 4 is installed in the stopping space 21 for the vehicle 2, as illustrated in FIG. 1 and FIG. 2. The power supply device 4 includes the power supply fitting body 40, the charging device 49, the moving unit 5, and the position detection device 6 (see FIG. 5). The charging device 49 is installed on the ground in the stopping space 21, for example. The moving unit 5 is installed along the ground surface 26 of the stopping space 21, for example.

The power supply fitting body 40 illustrated in FIG. 4 is what is called a coupler. The power supply fitting body 40 can be fitted to the power reception fitting body 3 by being inserted into the internal space 34s of the power reception fitting body 3. The power supply fitting body 40 can be extracted from the power reception fitting body 3 by being moved in the extraction direction X2 from its fitted state. The power supply fitting body 40 includes the power supply power terminals (power supply terminals) 41b, power supply signal terminals 41a, and a power supply terminal holding part 43, as illustrated in FIG. 4 and FIG. 5.

The power supply power terminal 41b is electrically connected to the charging device 49 located near the stopping space 21 outside the vehicle. The power supply power terminal 41b is thicker in the radial direction than the power supply signal terminal 41a in the radial direction. The power supply power terminals 41b include, for example, a first power supply power terminal 41b1 and a second power supply power terminal 41b2. In other words, the power supply fitting body 40 in the present embodiment includes the two power supply power terminals 41b. The power supply power terminals 41b are electrically connected to ends of respective power supply power wires 42b. The power supply power wires 42b include a first power supply power wire 42b1 and a second power supply power wire 42b2. The first power supply power terminal 41b1 is electrically connected to the end of the first power supply power wire 42b1. The second power supply power terminal 41b2 is electrically connected to the end of the second power supply power wire 42b2.

The power supply power terminal 41b and the power supply power wire 42b are installed in the middle of the power supply line that supplies power from the charging device 49 to the battery 22. The power supply line includes the power reception power terminals 31b, the power reception power wires 32, the power supply terminals 41b, and the power supply wires 42.

An engagement convex part 41b11 is formed at the tip of the first power supply power terminal 41b1. The engagement convex part 41b11 protrudes from the tip of the first power supply power terminal 41b1 to the insertion direction X1, extends in the insertion direction X1, and can be engaged with the engagement concave part 31b11. An engagement convex part 41b21 is formed at the tip of the second power supply power terminal 41b2. The engagement convex part 41b21 protrudes from the tip of the second power supply power terminal 41b2 toward the insertion direction X1, extends with respect to the insertion direction X1, and can be engaged with the engagement concave part 31b21.

The power supply signal terminal 41a is formed of conductive metal in a cylindrical columnar shape, extending along the insertion-extraction direction X. The power supply signal terminals 41a include, for example, a first power supply signal terminal 41a1 and a second power supply signal terminal 41a2. In other words, the power supply fitting body 40 in the present embodiment includes the two power supply signal terminals 41a. The power supply signal terminals 41a are electrically connected to ends of respective power supply signal wires 42a. The power supply signal wires 42a include a first power supply signal wire 42a1 and a second power supply signal wire 42a2. The first power supply signal terminal 41a1 is electrically connected to the end of the first power supply signal wire 42a1. The second power supply signal terminal 41a2 is electrically connected to the end of the second power supply signal wire 42a2.

The power supply signal terminals 41a and the power supply signal wires 42a are provided in the middle of the signal line where signals are exchanged between the charging device 49 and the battery 22. The signal line includes the power reception signal terminals 31a, the power reception signal wires 32a, the power supply signal terminals 41a, and the power supply signal wires 42a.

The power supply fitting body 40 includes the (two) power supply power terminals 41b arranged in the lateral direction Y. In addition to the (two) power supply power terminals 41b, the power supply fitting body 40 includes the (two) power supply signal terminals 41a arranged in the lateral direction Y on the sides of both the power supply power terminals 41b in the lateral direction Y. In other words, the power supply fitting body 40 in the present embodiment includes the two power supply terminals 41b arranged adjacent to each other in the lateral direction Y, and the two power supply signal terminals 41a arranged adjacent to those power supply power terminals 41b on both sides in the lateral direction Y.

The power supply terminal holding part 43 is formed of the synthetic resin with the insulating property and houses and holds the power supply power terminals 41b and the power supply signal terminals 41a. The power supply terminal holding part 43 is formed in a rectangular tubular shape with a pair of first power supply facing parts 441 and 442 facing each other in the up-down direction Z, and a pair of second power supply facing parts 443 and 444 facing each other in the lateral direction Y. The power supply terminal holding part 43 includes a power supply internal space 44s formed by the pair of first power supply facing parts 441 and 442 and the pair of second power supply facing parts 443 and 444.

The power supply terminal holding part 43 includes a power supply terminal first opening 44o1 at an end part of the power supply power terminal 41b on the insertion direction X1 side. The power supply terminal first opening 44o1 connects between the power supply internal space 44s and the outside. While the power reception fitting body 3 and the power supply fitting body 40 are fitted together, the power reception power terminal 31b and the power reception signal terminal 31a are inserted through the power supply terminal first opening 44o1. The power supply terminal holding part 43 includes a power supply terminal second opening 44o2 at an end part of the power supply terminal 41 on the extraction direction X2 side. The power supply terminal second opening 44o2 connects between the power supply internal space 44s of the power supply terminal holding part 43 and the outside. The power supply power wire 42b and the power supply signal wire 42a are inserted through the power supply terminal second opening 44o2.

The power supply fitting body 40 in the present embodiment is attached through a fixing member 54c to the tips of a pair of support arms 53c1 and 53c2 described later in the moving unit 5 (see FIG. 5).

The charging device 49 illustrated in FIG. 1 is electrically connected to each power supply power terminal 41b through each power supply power wire 42b. The charging device 49 is connected to an external power source, converts AC power supplied from the external power source into DC current, and supplies power to the battery 22 through the power supply power wire 42b, the power supply power terminal 41b, the power reception power terminal 31b, and the power reception power wire 32, thereby charging the battery 22.

The moving unit 5 illustrated in FIG. 5 and FIG. 6 moves the power supply fitting body 40 in the insertion-extraction direction X, the lateral direction Y, and the up-down direction Z as described later. The moving unit 5 includes a first moving mechanism 51, a second moving mechanism 52, a third moving mechanism 53, and a pitch-swinging mechanism 54 as illustrated in FIG. 2 and FIG. 5.

The first moving mechanism 51 includes a width-direction driving source 51a, a first rotation shaft 51b, a first drive transmission member 51c, a first loading platform 51d, and a pair of first guide members 51e1 and 51e2.

The width-direction driving source 51a is, for example, an electric motor and includes a first drive shaft 51a1 that is rotated and driven based on a command from the controller 10.

The first rotation shaft 51b is formed in a cylindrical columnar shape, extending in the lateral direction Y. Along a peripheral surface of the first rotation shaft 51b, a first male thread is formed. One end part of the first rotation shaft 51b in the lateral direction Y is fixed to the first drive shaft 51a1.

The first drive transmission member 51c transmits the driving force of the width-direction driving source 51a to the first loading platform 51d through the first rotation shaft 51b. The first drive transmission member 51c includes a first drive transmission member body 51c1 extending in the insertion-extraction direction X and formed in a plate shape, and a first tubular member 51c2 including a first female screw that is engaged with the first male screw. The first drive transmission member body 51c1 has the first tubular member 51c2 placed at an end part on the extraction direction X2 side, and has an end part on the insertion direction X1 side fixed to the first loading platform 51d.

The first loading platform 51d is formed in a plate shape having a plane orthogonal to the up-down direction Z. In other words, the first loading platform 51d is formed in a plate shape extending along the insertion-extraction direction X and along the lateral direction Y. The second moving mechanism 52 is fixed to the first loading platform 51d.

The pair of first guide members 51e1 and 51e2 is provided between the first loading platform 51d and the ground surface 26 in the up-down direction Z, and guides the movement of the first loading platform 51d in the lateral direction Y by the drive of the width-direction driving source 51a. Each of the first guide members 51e1 and 51e2 is formed in a square columnar shape extending in the lateral direction Y. One first guide member 51e1 and the other first guide member 51e2 are arranged apart from each other in the insertion-extraction direction X.

Regarding the first moving mechanism 51, when the width-direction driving source 51a is driven based on the command from the controller 10, the first drive shaft 51a1 is rotated and driven, and the rotational drive of the first drive shaft 51a1 causes the first drive transmission member 51c and the first loading platform 51d to move to one side of the lateral direction Y. When the drive of the width-direction driving source 51a is stopped based on the command from the controller 10, the first moving mechanism 51 stops moving the first drive transmission member 51c and the first loading platform 51d in the lateral direction Y. Furthermore, in the first moving mechanism 51, when the width-direction driving source 51a is driven reversely based on the command from the controller 10, the first drive shaft 51a1 is rotated and driven, and the rotational drive of the first drive shaft 51a1 causes the first drive transmission member 51c and the first loading platform 51d to move to the other side of the lateral direction Y. In other words, the first moving mechanism 51 is a mechanism that moves the power supply fitting body 40 in the insertion-extraction direction X.

The second moving mechanism 52 includes an insertion-extraction-direction driving source 52a, a second rotation shaft 52b, a second drive transmission member 52c, a second loading platform 52d, and a pair of second guide members 52e1 and 52e2.

The insertion-extraction-direction driving source 52a is, for example, an electric motor and includes a second drive shaft 52a1 that is rotated and driven based on the command from the controller 10.

The second rotation shaft 52b is formed in a cylindrical columnar shape, extending in the insertion-extraction direction X. Along a peripheral surface of the second rotation shaft 52b, a second male thread is formed. One end part of the second rotation shaft 52b in the insertion-extraction direction X is fixed to the second drive shaft 52a1.

The second drive transmission member 52c transmits the driving force of the insertion-extraction-direction driving source 52a through the second rotation shaft 52b to the second loading platform 52d. The second drive transmission member 52c includes a second drive transmission member body 52c1 extending in the lateral direction Y and formed in a plate shape, and a second tubular member 52c2 including a second female screw that is engaged with the second male screw. The second drive transmission member body 52c1 has the second tubular member 52c2 placed at an end part on one side in the lateral direction Y, and has an end part on the other side in the lateral direction Y fixed to the second loading platform 52d.

The second loading platform 52d is formed in a plate shape having a plane orthogonal to the up-down direction Z. In other words, the second loading platform 52d is formed in a plate shape extending along the insertion-extraction direction X and along the lateral direction Y. Then, the third moving mechanism 53 is fixed to the second loading platform 52d.

The pair of second guide members 52e1 and 52e2 is provided between the second loading platform 52d and the first loading platform 51d in the up-down direction Z, and guides the movement of the second loading platform 52d in the insertion-extraction direction X by the drive of the insertion-extraction-direction driving source 52a. Each of the second guide members 52e1 and 52e2 is formed in a square columnar shape extending in the insertion-extraction direction X. One second guide member 52e1 and the other second guide member 52e2 are disposed apart from each other in the lateral direction Y.

Regarding the second moving mechanism 52, when the insertion-extraction-direction driving source 52a is driven based on the command from the controller 10, the second drive shaft 52a1 is rotated and driven, and the rotational drive of the second drive shaft 52a1 causes the second drive transmission member 52c and the second loading platform 52d to move to the insertion direction X1 side. When the drive of the insertion-extraction-direction driving source 52a is stopped based on the command from the controller 10, the second moving mechanism 52 stops moving the second drive transmission member 52c and the second loading platform 52d in the insertion-extraction direction X. Furthermore, in the second moving mechanism 52, when the insertion-extraction-direction driving source 52a is driven reversely based on the command from the controller 10, the second drive shaft 52a1 is rotated and driven, and the rotational drive of the second drive shaft 52a1 causes the second drive transmission member 52c and the second loading platform 52d to move to the extraction direction X2 side. In other words, the second moving mechanism 52 is a mechanism that moves the power supply fitting body 40 in the lateral direction Y.

The third moving mechanism 53 includes an insertion-extraction-direction and up-down-direction driving source 53a, a third drive transmission member 53b formed in an approximately cylindrical columnar shape that transmits the driving force of the insertion-extraction-direction and up-down-direction driving source 53a, and the pair of support arms 53c1 and 53c2 provided on both ends of the rotation shaft of the third drive transmission member 53b.

The insertion-extraction-direction and up-down-direction driving source 53a is, for example, an electric motor and includes a third drive shaft that is rotated and driven based on the command from the controller 10.

The third drive transmission member 53b has a shaft center 53x extending in the lateral direction Y, a third drive transmission member body 53b1 that rotates around the shaft center 53x when the insertion-extraction-direction and up-down-direction driving source 53a is driven, and a shaft member that protrudes from both ends of the third drive transmission member body 53b1 in the lateral direction Y.

Each of the support arms 53c1 and 53c2 is fixed to the shaft member of the third drive transmission member 53b, and when the insertion-extraction-direction and up-down-direction driving source 53a is driven, each of the support arms 53c1 and 53c2 swings around the shaft center 53x.

In the third moving mechanism 53, when the insertion-extraction-direction and up-down-direction driving source 53a is driven based on the command from the controller 10, the third drive transmission member body 53b1 rotates around the shaft center 53x to one side of the circumferential direction of the shaft center 53x, and additionally, each of the support arms 53c1 and 53c2 swings around the shaft center 53x in an arrow R1 direction in FIG. 5. In the third moving mechanism 53, when the insertion-extraction-direction and up-down-direction driving source 53a is driven reversely based on the command from the controller 10, the third drive transmission member body 53b1 rotates around the shaft center 53x to the other side of the circumferential direction of the shaft center 53x, and each of the support arms 53c1 and 53c2 swings around the shaft center 53x in an arrow R2 direction in FIG. 5.

By the driving of the insertion-extraction-direction and up-down-direction driving source 53a, the third moving mechanism 53 changes between a lying posture in which the support arms 53c1 and 53c2 extend along the insertion-extraction direction X and an upright posture in which the support arms 53c1 and 53c2 extend at an angle to the insertion-extraction direction X. When the third moving mechanism 53 sets the support arms 53c1 and 53c2 in the lying posture, the power supply fitting body 40 is placed at the position closest to the ground surface 26. When the support arms 53c1 and 53c2 swing in the arrow R1 direction in FIG. 5 around the shaft center 53x from the lying posture, the power supply fitting body 40 moves in the upward direction Z1 along the up-down direction Z and in the extraction direction X2. In other words, the third moving mechanism 53 is a mechanism that moves the power supply fitting body 40 in the up-down direction Z and the insertion-extraction direction X.

The pitch-swinging mechanism 54 is an pitch-swinging mechanism that swings the power supply fitting body 40 around a shaft center 54x parallel to the lateral direction Y. The pitch-swinging mechanism 54 includes a pitch-swinging driving source, a fourth drive transmission member 54b including a plurality of gears 54a that transmit the driving force of the pitch-swinging driving source, and the fixing member 54c fixed to a gear 54a1 disposed on the outermost side in the circumferential direction with respect to the shaft center 53x among the gears 54a.

The pitch-swinging driving source is, for example, an electric motor, which is rotated and driven based on the command from the controller 10.

Each gear 54a in the fourth drive transmission member includes a shaft center extending in the lateral direction Y. Both ends of the shaft member of each gear 54a are rotatably attached to the pair of support arms 53c1 and 53c2. The gears 54a are engaged with each other. The fixing member 54c is fixed to the power supply fitting body 40 through an elastic member such as a spring.

In the pitch-swinging mechanism 54, when the pitch-swinging driving source is driven based on the command from the controller 10, a gear 54a2 rotates by the driving force of the pitch-swinging driving source. The driving force of the pitch-swinging driving source is transmitted through the gears 54a, and the gear 54a1 disposed on the outermost side in the circumferential direction with respect to the shaft center 53x rotates around the shaft center 54x.

When the gear 54a1 rotates in an arrow R3 direction in FIG. 5 around the shaft center 54x, the swinging operation is performed to change the posture of the power supply fitting body 40 so that the tip of the power supply power terminal 41b faces in the upward direction Z1. When the gear 54a1 rotates in an arrow R4 direction in FIG. 5 around the shaft center 54x, the swinging operation is performed to change the posture of the power supply fitting body 40 so that the tip of the power supply power terminal 41b faces in the downward direction Z2.

With the above-mentioned moving unit 5, a rectangular movement area 29 for the power supply fitting body 40 is set in the stopping space 21 by the position where the power supply fitting body 40 has moved to the most extraction direction X2 side, the position where the power supply fitting body 40 has moved to the most insertion direction X1 side, the position where the power supply fitting body 40 has moved to the most one side of the lateral direction Y, and the position where the power supply fitting body 40 has moved to the most other side of the lateral direction Y (see FIG. 2).

The position detection device 6 includes, for example, a light-emitting element 61 that delivers detection light toward the upward direction Z1 along the up-down direction Z, and a light-receiving element 62 that receives the reflected light resulting from the reflection of the detection light from the light-emitting element 61 on the power reception ceiling part 36. The light-emitting element 61 and the light-receiving element 62 are provided on the fixing member 54c, for example. In other words, the position detection device 6 in the present embodiment moves in linkage with the movement of the power supply fitting body 40 by the moving unit 5. The light-emitting element 61 and the light-receiving element 62 are placed adjacent to each other in the lateral direction Y, for example. The distance from the position detection device 6 to the power supply fitting body 40 in the insertion-extraction direction X is determined in advance, and the distance from the position detection device 6 to the power supply fitting body 40 in the lateral direction Y is determined in advance. In other words, the distances from the position detection device 6 to the power supply fitting body 40 in the insertion-extraction direction X and in the lateral direction Y are set in advance. The position detection device 6 includes, for example, the light-emitting element 61 and the light-receiving element 62 that receives reflected laser emitted from the light-emitting element 61. The position detection device 6 may be a light detection and ranging (LIDAR) or a millimeter wave radar. The position detection device 6 detects the ceiling surface 36F and the groove 37 by the time difference between when the detection light emitted from the light-emitting element 61 is reflected by the ceiling surface 36F and the detection light reflected by the ceiling surface 36F is detected by the light-receiving element 62, and when the detection light is reflected by the bottom part of the groove 37 and the detection light reflected by the bottom part of the groove 37 is detected by the light-receiving element 62.

The controller 10 controls the parts of the power supply device 4 generally. Then, the controller 10 performs the fitting operation to fit the power supply fitting body 40 and the power reception fitting body 3 together by driving the moving unit 5.

The action of the vehicle charging system 1 with the above structure is described below. First, the stopping space 21 is not occupied by the vehicle 2. The moving unit 5 of the vehicle charging system 1 has moved to the home position in the movement area 29, where the power supply fitting body 40 and the position detection device 6 have been moved to the most extraction direction X2 side and to one side of the lateral direction Y. The moving unit 5 of the vehicle charging system 1 moves the support arms 53c1 and 53c2 to the arrow R2 side in FIG. 5, and makes the support arms 53c1 and 53c2 extend along the insertion-extraction direction X. In this state, as illustrated in FIG. 1, the occupant drives and stops the vehicle 2 in the stopping space 21.

Figure 8:
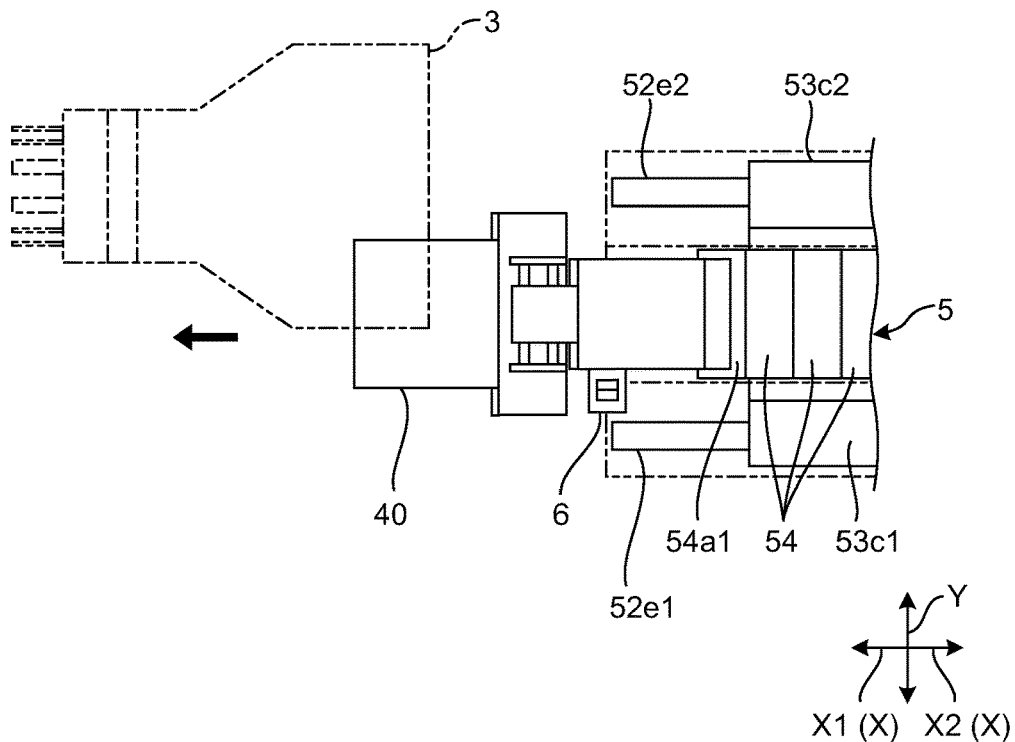
FIG. 8 is a plan view for sequentially describing the fitting operation performed by a controller.

When the vehicle 2 stopped in the stopping space 21 is detected by a sensor that is not illustrated, the controller 10 of the vehicle charging system 1 causes the moving unit 5 to move the position detection device 6 to the insertion direction X1 side in the insertion-extraction direction X while emitting the detection light from the light-emitting element 61 as illustrated in FIG. 8. Thus, the detection light is scanned in the insertion-extraction direction X.

Upon the detection of predetermined detection light with the light-receiving element 62 in the aforementioned scanning (upon the detection of the first structure), the controller 10 calculates the position of the second structure in the insertion-extraction direction X from the detected first structure. That is to say, upon the detection of the first lateral-direction extension groove 37Y1 and the second lateral-direction extension groove 37Y2 with the detection light of the light-receiving element 62, the controller 10 calculates the positions of the first insertion-extraction-direction extension groove 37X1, the second insertion-extraction-direction extension groove 37X2, the third lateral-direction extension groove 37Y3, and the fourth lateral-direction extension groove 37Y4 in the insertion-extraction direction X. If the controller 10 fails to detect the first structure, the position detection device 6 is moved to the one side in the lateral direction Y and the aforementioned scanning is repeated.

Figure 9:
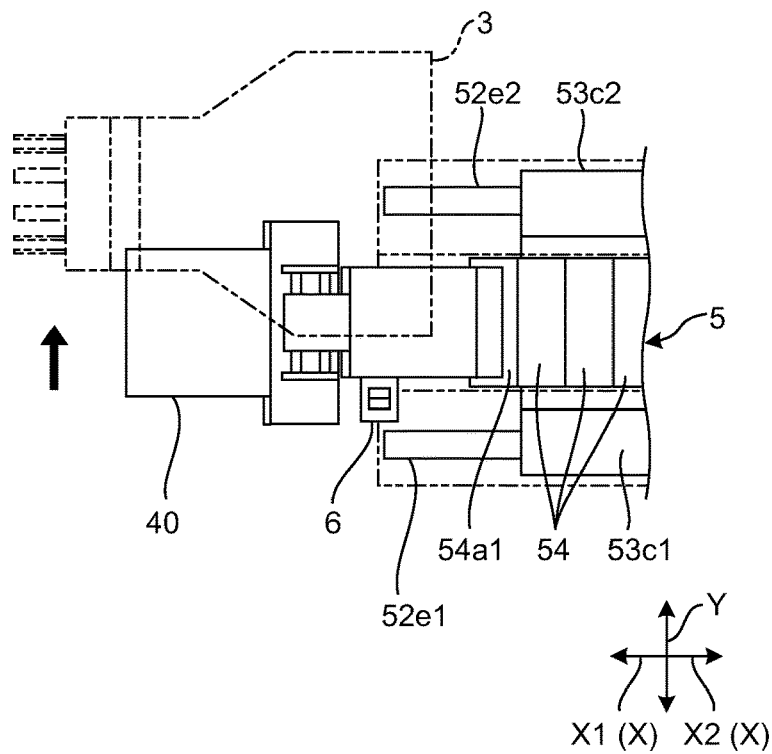
FIG. 9 is a plan view for sequentially describing the fitting operation performed by the controller.

Next, as illustrated in FIG. 9, the controller 10 causes the moving unit 5 to move the position detection device 6 to the calculated position of the second structure in the insertion-extraction direction X. That is to say, the controller 10 causes the moving unit 5 to move the position detection device 6 to the calculated positions of the first insertion-extraction-direction extension groove 37X1, the second insertion-extraction-direction extension groove 37X2, the third lateral-direction extension groove 37Y3, and the fourth lateral-direction extension groove 37Y4.

Next, the controller 10 causes the moving unit 5 to move the position detection device 6 from one side to the other side in the lateral direction Y while causing the light-emitting element 61 to emit the detection light, thereby scanning the detection light in the lateral direction Y.

Figure 10:
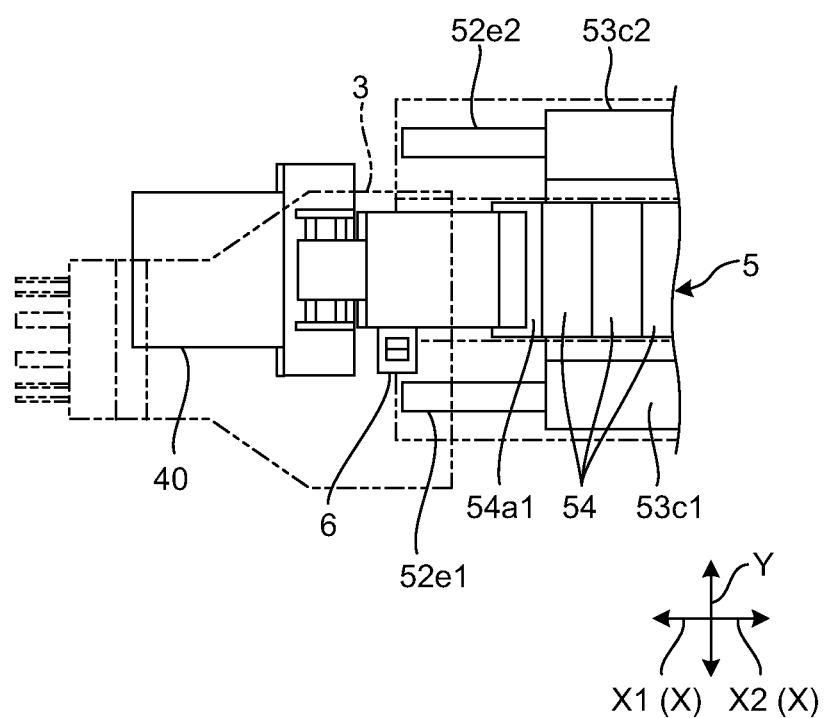
FIG. 10 is a plan view for sequentially describing the fitting operation performed by the controller.

In the scanning described above, when the controller 10 detects predetermined detection light with the light-receiving element 62 (detects the second structure) as illustrated in FIG. 10, the controller 10 calculates the central position of the power reception fitting body 3 in the lateral direction Y from the detected second structure. In other words, when the controller 10 detects predetermined detection light with the light-receiving element 62 and detects the first insertion-extraction-direction extension groove 37X1, the second insertion-extraction-direction extension groove 37X2, the third lateral-direction extension groove 37Y3, and the fourth lateral-direction extension groove 37Y4, the controller 10 calculates the central position of the power reception fitting body 3 in the lateral direction Y from these detected extension grooves 37X1, 37X2, 37Y3, and 37Y4.

Next, the controller 10 makes the central position of the power supply fitting body 40 in the lateral direction Y coincide with the calculated central position of the power reception fitting body 3 in the lateral direction Y by driving the moving unit 5.

Figure 11:
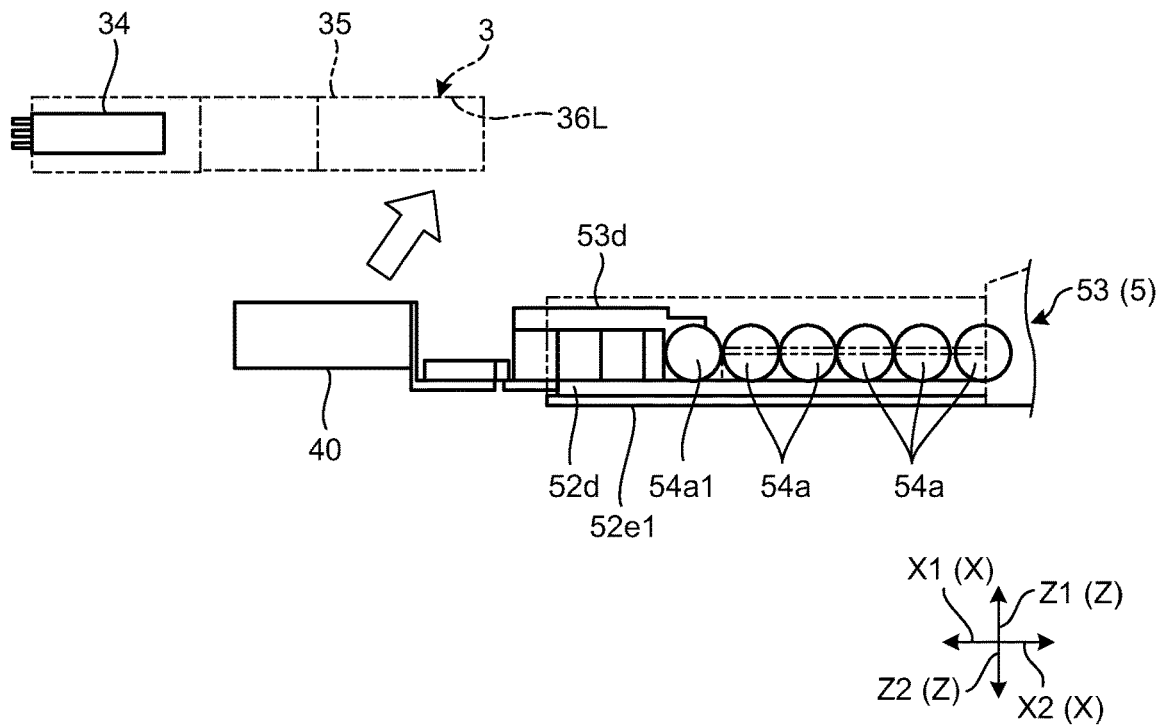
FIG. 11 is a plan view for sequentially describing the fitting operation performed by the controller.

Next, as illustrated in FIG. 11, the controller 10 drives the third moving mechanism 53 to move the power supply fitting body 40 in the upward direction Z1 and also to the extraction direction X2 side, and drives the pitch-swinging mechanism 54 to change the posture of the power supply fitting body 40 so that the upper surface of the power supply fitting body 40 is parallel to the ceiling surface 36F.

Figure 12:
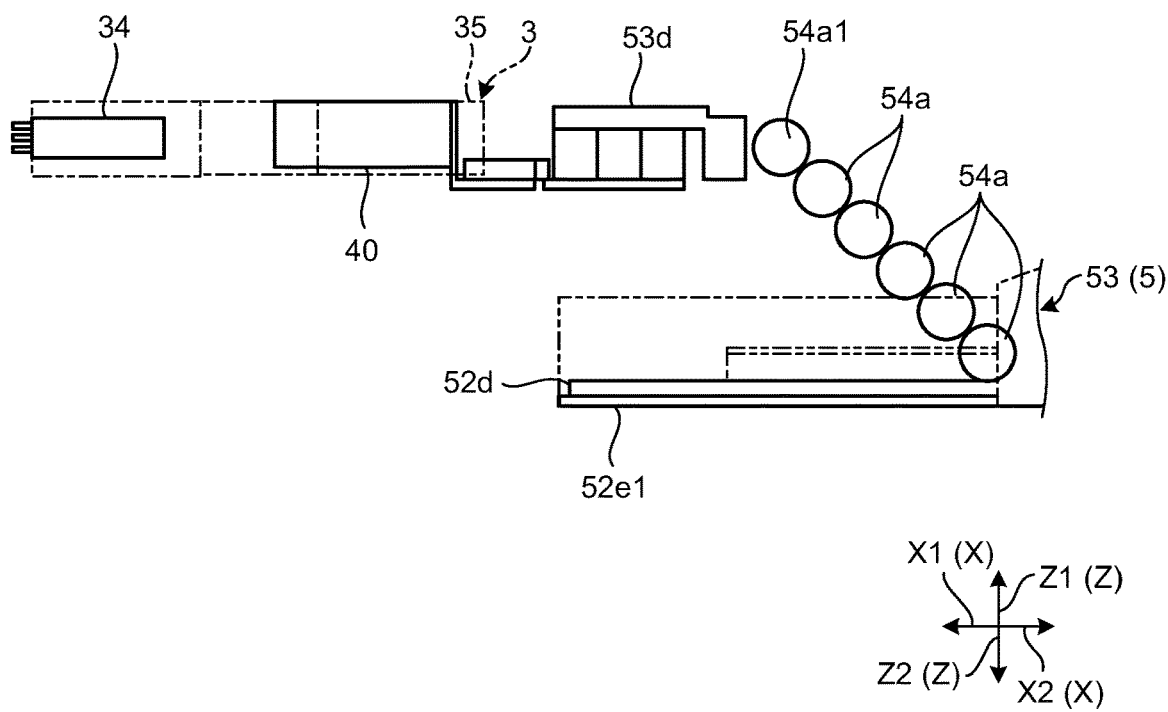
FIG. 12 is a plan view for sequentially describing the fitting operation performed by the controller.
Figure 13:
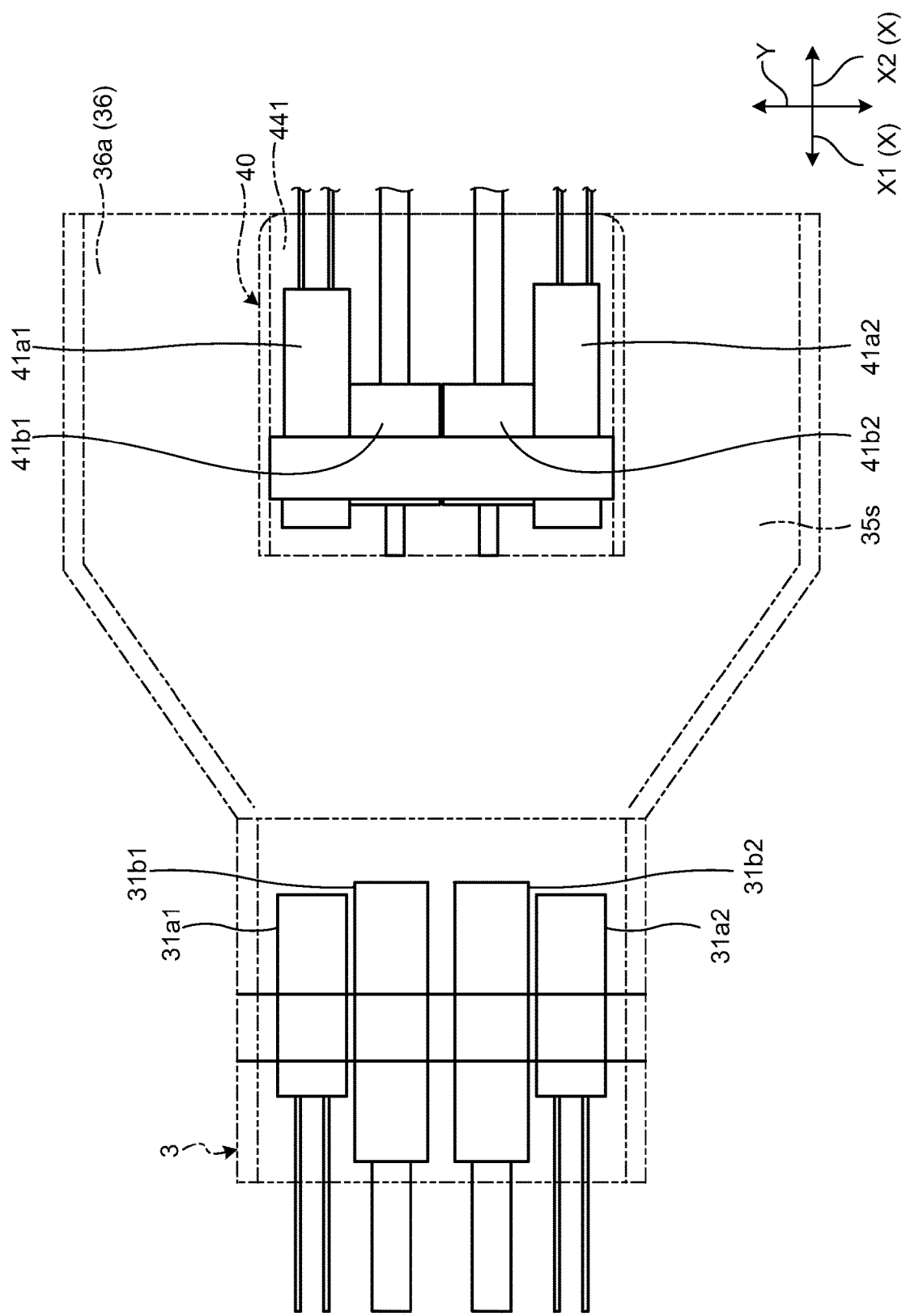
FIG. 13 is a plan view illustrating the opposing state in which the power reception fitting body and the power supply fitting body face each other in an insertion-extraction direction.

Next, the controller 10 stops driving the third moving mechanism 53 and the pitch-swinging mechanism 54 when the sensor that is not illustrated detects that the top surface of the power supply fitting body 40 is in contact with the ceiling surface 36F as illustrated in FIG. 12. In this state, as illustrated in FIG. 13, the power reception terminal holding part 34 of the power reception fitting body 3 and the power supply fitting body 40 face each other in the insertion-extraction direction X. In other words, in this state, each power reception power terminal 31b and each power supply power terminal 41b face each other and each power reception signal terminal 31a and each power supply signal terminal 41a face each other in the insertion-extraction direction X.

Figure 14:
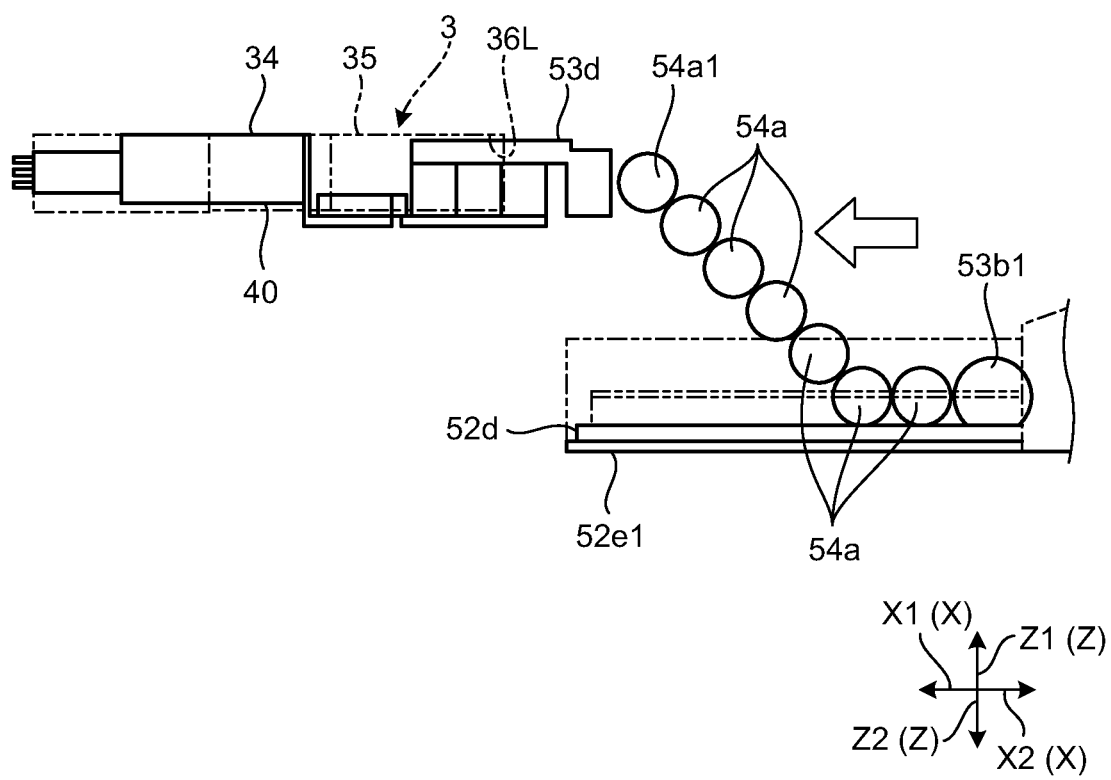
FIG. 14 is a plan view for sequentially describing the fitting operation performed by the controller.
Figure 15:
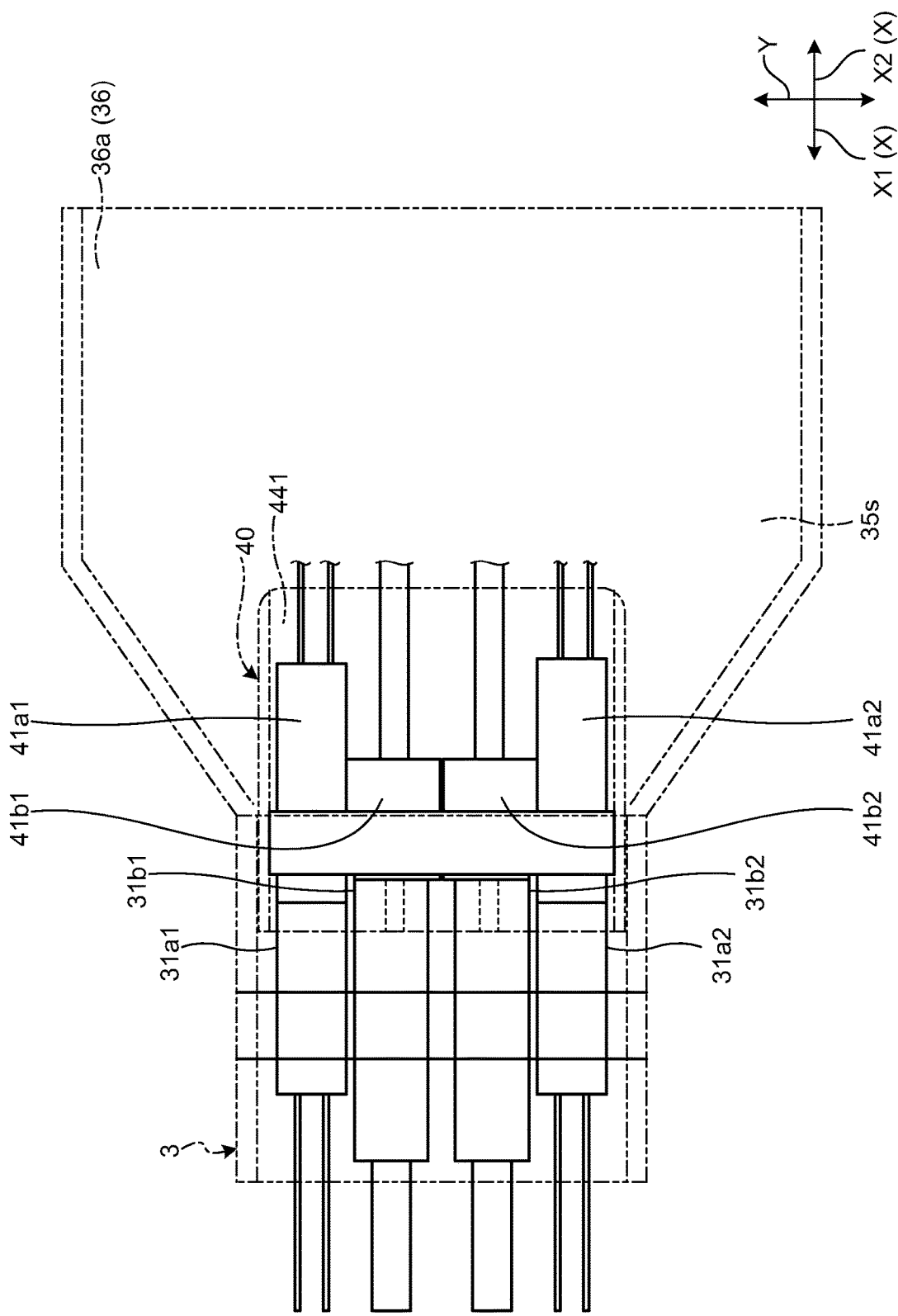
FIG. 15 is a plan view illustrating the state in which the power reception fitting body and the power supply fitting body are fitted together in the insertion-extraction direction.

Next, the controller 10 drives the second moving mechanism 52 to move the power supply fitting body 40 to the insertion direction X1 side, so that the power supply fitting body 40 is inserted into the power reception fitting body 3 as illustrated in FIG. 14. Thus, the power supply fitting body 40 is fitted to the power reception fitting body 3. In this fitted state, the power reception power terminals 31b are electrically connected to the respective power supply power terminals 41b, and the power reception signal terminals 31a are electrically connected to the respective power supply signal terminals 41a. Thus, the battery 22 is charged.

Then, when the battery 22 is fully charged, the controller 10 performs the reverse operation of the aforementioned operation.

The vehicle charging system 1 according to the present embodiment has the following structure. The power supply device 4 includes the moving unit 5 that moves the power supply fitting body 40 in the insertion-extraction direction X, the up-down direction Z, and the lateral direction Y that is orthogonal to the insertion-extraction direction X and the up-down direction Z, and the controller 10 that controls the movement of the power supply fitting body 40 by the moving unit 5. The position detection device 6 moves in linkage with the movement of the power supply fitting body 40 by the moving unit 5. The power reception fitting body 3 includes the first structures 37Y1 and 37Y2 extending along the lateral direction Y, and the second structures 37X1, 37X2, 37Y3, and 37Y4 related to the central position of the power reception fitting body 3 in the lateral direction Y. The first structures 37Y1 and 37Y2 and the second structures 37X1, 37X2, 37Y3, and 37Y4 are formed protruding to one side of the up-down direction Z with respect to the ceiling surface 36F. The distances between the second structures 37X1, 37X2, 37Y3, and 37Y4 and the first structures 37Y1 and 37Y2 in the insertion-extraction direction X are set in advance. Therefore, the vehicle charging system 1 according to the present embodiment can move the position detection device 6 using the moving unit 5 that moves the power supply fitting body 40 in the insertion-extraction direction X, the lateral direction Y, and the up-down direction Z. As a result, the vehicle charging system 1 according to the present embodiment requires neither an expensive imaging device nor a separate motor to move the position detection device 6. Therefore, the vehicle charging system 1 according to the present embodiment can reduce the cost. Furthermore, the vehicle charging system 1 according to the present embodiment can accurately calculate the central position of the power reception fitting body 3 in the lateral direction Y, so that the power reception fitting body 3 and the power supply fitting body 40 can be properly and securely fitted together.

The vehicle charging system 1 according to the present embodiment has the following structure. The multiple extension grooves 37Y1 and 37Y2, which are the first structures, are arranged along the insertion-extraction direction X on the ceiling surface 36F. The multiple extension grooves 37X1, 37X2, 37Y3, and 37Y4, which are the second structures, are arranged along the lateral direction Y on the ceiling surface 36F. Therefore, the position detection device 6 in the present embodiment can detect the first structures and the second structures for sure.

The first structures and the second structures in the aforementioned embodiment are formed by the grooves 37 protruding in the upward direction Z1 of the up-down direction Z with respect to the ceiling surface 36F. However, the first structures and the second structures are not limited to these structures. For example, the first structures and the second structures may be formed by a plurality of convex parts formed by protruding in the downward direction Z2 of the up-down direction Z with respect to the ceiling surface 36F. Furthermore, one of the first structures and the second structures may be formed by the grooves, and the other may be formed by the convex parts.

In the vehicle charging system 1 described above, a locking mechanism may be provided to maintain the fitted state in which the power supply fitting body 40 is inserted into the power reception fitting body 3 and a power supply fitting body 40A is fitted to a power reception fitting body 3A. When the locking mechanism is driven, the controller 10 stops driving the width-direction driving source 51a, the insertion-extraction-direction driving source 52a, the insertion-extraction-direction and up-down-direction driving source 53a, and the pitch-swinging driving source of the moving unit 5. When these driving sources are stopped, the power supply fitting body 40 is allowed to move in the insertion-extraction direction X, the lateral direction Y, and the up-down direction Z. Therefore, even if the height of the vehicle 2 from the ground surface 26 changes due to an increase or decrease in the number of occupants in the vehicle 2 while the battery 22 is charged by the charging device 49, and the position of the power reception fitting body 3 installed in the vehicle 2 changes in the insertion-extraction direction X, the lateral direction Y, and the up-down direction Z, the power supply fitting body 40 moves following the power reception fitting body 3. When the charging of the battery 22 by the charging device 49 is completed, the controller 10 releases the drive of the locking mechanism and drives the moving unit 5 to return to the original state.

Second Embodiment

Figure 18:
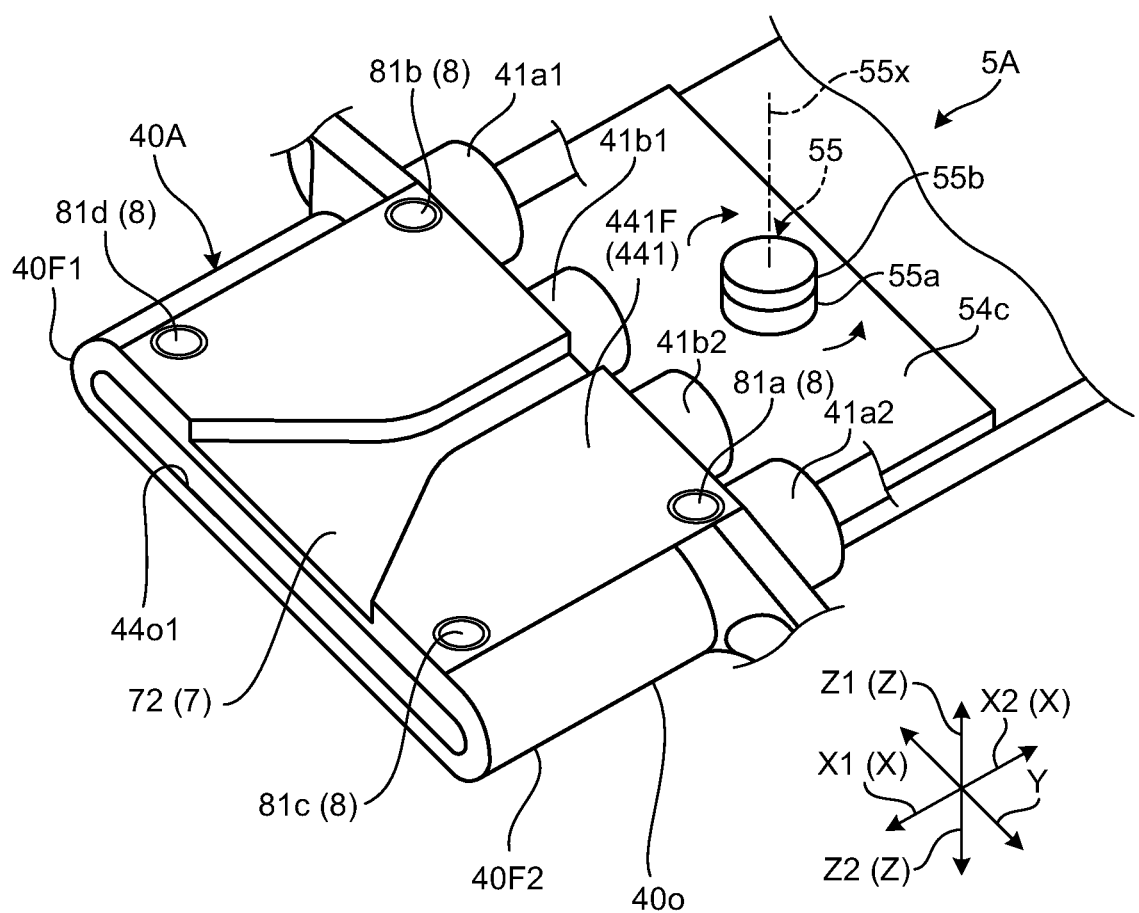
FIG. 18 is a perspective view of a power supply fitting body according to the second embodiment.
Figure 19:
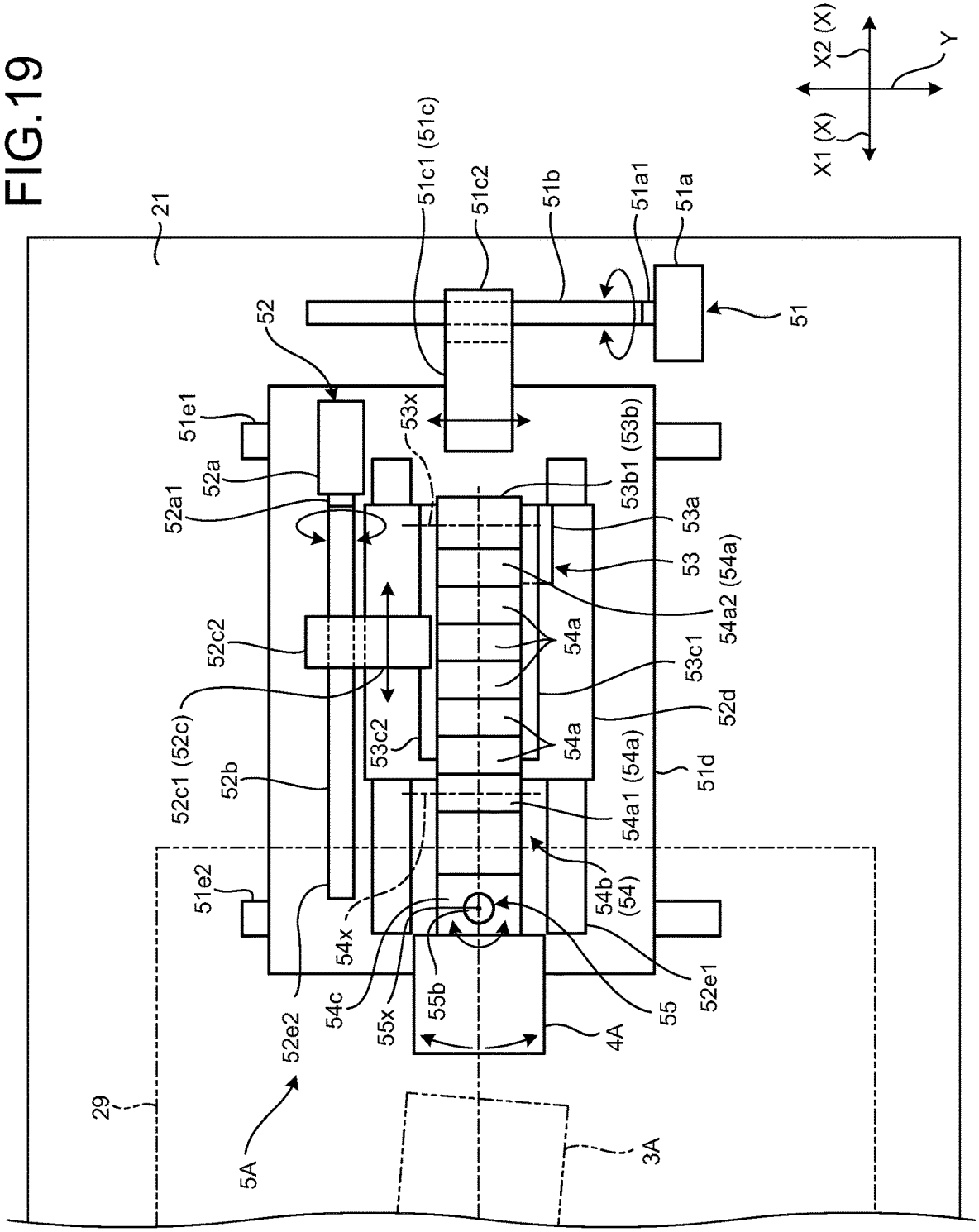
FIG. 19 is a schematic plan view of a moving unit in a vehicle charging system according to the second embodiment.

FIG. 16 to FIG. 19 are diagrams for describing the power reception fitting body 3A in a second embodiment in a vehicle charging system 1A according to the present invention. FIG. 16 is a perspective view of the power reception fitting body 3A according to the second embodiment. FIG. 17 is a side view of the power reception fitting body 3A according to the second embodiment. FIG. 18 is a perspective view of the power supply fitting body 40A according to the second embodiment. FIG. 19 is a schematic plan view of a moving unit 5A in the vehicle charging system 1A according to the second embodiment.

The power reception fitting body 3A in the second embodiment does not include the pair of third power reception facing parts 351a and 351b and the pair of fourth facing parts 353a and 353b, but includes a power reception ceiling part 36A and mounting members 38a and 38b for mounting the power reception fitting body 3A to the bottom part 25 of the vehicle 2. The mounting members 38a and 38b are located at both ends of the power reception fitting body 3A in the lateral direction Y.

A power reception terminal holding part 34A is formed in a rectangular tubular shape, and the power reception ceiling part 36A is formed in a thin plate shape. The power reception terminal holding part 34A is the first structure. More specifically, as illustrated in FIG. 17, the power reception terminal holding part 34A is formed protruding in the downward direction Z2 of the up-down direction Z with respect to the ceiling surface 36F. In the up-down direction Z, the difference in height between the ceiling surface 36F and a lower surface of the first power reception facing part 342 located in the downward direction Z2 of the power reception terminal holding part 34A is, for example, 50 mm or more. The protrusion with such a difference in height does not exist at the bottom part 25 of the vehicle 2.

In addition, the vehicle charging system 1A according to the present embodiment includes a guide mechanism 7 including a guide groove part 72 extending in the insertion-extraction direction X and a guide convex part 71 to be engaged with the guide groove part 72. In the guide mechanism 7, the guide convex part 71 is inserted into the guide groove part 72 when an upper surface 441F of the power supply fitting body 40A is brought into contact with the ceiling surface 36F. While the guide convex part 71 is inserted into the guide groove part 72, the guide mechanism 7 restricts the movement of the power supply fitting body 40A in the lateral direction Y with respect to the power reception fitting body 3 and allows the movement of the power supply fitting body 40A in the insertion-extraction direction X with respect to the power reception fitting body 3. In the guide mechanism 7 in the present embodiment, the guide groove part 72 is provided to the power supply fitting body 40A, and the guide convex part 71 is provided to the ceiling surface 36F. The guide convex part 71 in the guide mechanism 7 is the second structure formed on the ceiling surface 36F. The guide convex part 71 is formed protruding in the downward direction Z2 of the up-down direction Z with respect to the ceiling surface 36F. The guide convex part 71 extends along the axis line 36L, which is at the central position of the power reception fitting body 3A in the lateral direction Y. In the up-down direction Z, when viewed from the downward direction Z2 side, the power reception terminal holding part 34A, which is the first structure part, and a part of the guide convex part 71, which is the second structure, overlap with each other.

The guide groove part 72 is formed in such a way that the guide groove part 72 is wider on the insertion direction X1 side and becomes narrower toward the extraction direction X2 side. The guide convex part 71 is formed in such a way that the tip on the extraction direction X2 side is tapered, and the part excluding the tip is formed so that the width in the lateral direction Y is constant.

At each of the four corners of the upper surface 441F (more specifically, the upper surface of the first power supply facing part 441) of the power supply fitting body 40A illustrated in FIG. 18, a sensor 8 that detects the contact of the upper surface 441F of the power supply fitting body 40A with the ceiling surface 36F is provided. The sensors 8 are a first sensor 81a, a second sensor 81b, a third sensor 81c, and a fourth sensor 81d. Each sensor 8 is, for example, a touch sensor.

Similar to the moving unit 5 described above, the moving unit 5A includes the pitch-swinging mechanism 54 that swings the power supply fitting body 40A around the shaft center (rotation shaft) 54x that is parallel to the lateral direction Y.

Then, the controller 10 drives the pitch-swinging mechanism 54 according to the detection results from the sensors 8 to bring the four corners of the upper surface 441F of the first power supply facing part 441 of the power supply fitting body 40A in contact with the ceiling surface 36F.

As described above, the moving unit 5 includes the insertion-extraction-direction driving source 52a that moves the power supply fitting body 40A in the insertion-extraction direction X. Then, when the output of the insertion-extraction-direction driving source 52a exceeds a predetermined threshold, the controller 10 determines that the power reception power terminal 31b and the power supply power terminal 41b are electrically connected, and stops driving the insertion-extraction-direction driving source 52a.

The moving unit 5A of the vehicle charging system 1A according to the present embodiment includes a yaw-swinging mechanism 55 that swings the power supply fitting body 40A around a shaft center 55x parallel to the up-down direction Z as illustrated in FIG. 18.

In the yaw-swinging mechanism 55, a shaft 55a provided to the power supply fitting body 40A is mounted to a shaft 55b of the fixing member 54c in a manner that the shaft 55a can rotate around the shaft center 55x. The yaw-swinging mechanism 55 does not include a driving source.

In the vehicle charging system 1A according to the present embodiment, when the vehicle 2 stops due to the driving operation of the occupant, the vehicle 2 may deviate from the lateral direction Y of the stopping space 21 as illustrated in FIG. 19 in which the vehicle 2 is viewed from the up-down direction Z. In this case, in the vehicle charging system 1A, in the insertion-extraction direction X, the right side, which is one side of the power reception fitting body 3A in FIG. 19, is separated from a power supply fitting body 4A, while the left side, which is the other side of the power reception fitting body 3A in FIG. 19, gets closer to the power supply fitting body 4A.

On the other hand, in the yaw-swinging mechanism 55, when a pair of power supply fitting body both side surfaces 40F1 and 40F2, which face each other in the lateral direction Y, of an outer surface 40*o* of the power supply fitting body 40A is in contact with a pair of power reception fitting body both side surfaces 34F1 and 34F2, which face each other in the lateral direction Y, of an inner surface 34*i* of the power reception fitting body 3A, the power supply fitting body 40A moves as below with the external force generated by this contact.

In other words, the yaw-swinging mechanism 55 rotates the power supply fitting body 40A around the shaft center 55*x* so that an end surface of the power supply fitting body 40A on the insertion direction X1 side and an end surface of the power reception fitting body 3A on the extraction direction X2 side face each other.

Therefore, in the vehicle charging system 1A according to the present embodiment, even when the vehicle 2 stops so that the end surface of the power supply fitting body 40A on the insertion direction X1 side and the end surface of the power reception fitting body 3A on the extraction direction X2 side do not face each other in the insertion-extraction direction X, the yaw-swinging mechanism 55 allows the power supply fitting body 40A and the power reception fitting body 3A to be fitted together.

The vehicle charging system 1 according to the present embodiment has the following structure. The power reception terminal holding part 34 is the first structure. Therefore, in the vehicle charging system 1 according to the present embodiment, the power reception terminal holding part 34 is regarded as the first structure using the shape of the power reception terminal holding part 34 and the shape of the power reception ceiling part 36, and thus, the amount of material used to form the first structure can be reduced. As a result, the vehicle charging system 1 according to the present embodiment can be obtained at lower cost.

The vehicle charging system 1 according to the present embodiment has the following structure. One of the guide groove part 72 and the guide convex part 71 formed on the ceiling surface 36F is the second structure. Therefore, in the vehicle charging system 1 according to the present embodiment, the guide groove part 72 or the guide convex part 71 of the guide mechanism 7 is regarded as the second structure using the shape of the guide groove part 72 or the guide convex part 71 and thus, the amount of material used to form the second structure can be reduced. As a result, the vehicle charging system 1 according to the present embodiment can be obtained at much lower cost.

The vehicle charging system 1 according to the present embodiment has the following structure. The moving unit 5 includes the pitch-swinging mechanism 54 that swings the power supply fitting body 40A around the shaft center 54*x* parallel to the lateral direction Y. The upper surface 441F of the power supply fitting body 40A includes the sensors 8 that detect the contact of the upper surface 441F of the power supply fitting body 40A with the ceiling surface 36F, and in accordance with the detection results from the sensors 81, the controller 10 brings the upper surface 441F of the power supply fitting body 40A into contact with the ceiling surface 36F. Therefore, the vehicle charging system 1 according to the present embodiment can bring the upper surface 441F of the power supply fitting body 40A in contact with the ceiling surface 36F. As a result, the vehicle charging system 1 according to the present embodiment can properly control the posture of the power supply fitting body 40A relative to the power reception fitting body 3, and can securely fit the power supply fitting body 40A to the power reception fitting body 3.

The vehicle charging system 1 according to the present embodiment has the following structure. The moving unit 5 includes the insertion-extraction-direction driving source 52*a* that moves the power supply fitting body 40A in the insertion-extraction direction X. When the output of the insertion-extraction-direction driving source 52*a* exceeds a predetermined threshold, the controller 10 determines that the power reception power terminal 31*b* and the power supply power terminal 41*b* are electrically connected and stops driving the insertion-extraction-direction driving source 52*a*. Therefore, the vehicle charging system 1 according to the present embodiment can suppress the half-fitted state in which the insertion of the power supply fitting body 40A into the power reception fitting body 3 is incomplete and the power reception power terminal 31*b* and the power supply power terminal 41*b* are not electrically connected. As a result, the vehicle charging system 1 according to the present embodiment can ensure the electrical connection between the power reception power terminal 31*b* and the power supply power terminal 41*b*.

The vehicle charging system 1 according to the present embodiment has the following structure. The moving unit 5 includes the yaw-swinging mechanism 55 that swings the power supply fitting body 40 around the shaft center 55*x* parallel to the up-down direction Z. When one of the pair of power supply fitting body both side surfaces 40F1 and 40F2, which face each other in the lateral direction Y, of the outer surface 40*o* of the power supply fitting body 40 is in contact with the pair of power reception fitting body both side surfaces 34F1 and 34F2, which face each other in the lateral direction Y, of the inner surface 34*i* of the power reception fitting body 3A, the yaw-swinging mechanism 55 causes the power supply fitting body both side surfaces 40F1 and 40F2 and the power reception fitting body both side surfaces 34F1 and 34F2 to face each other in the lateral direction Y, so that the power reception fitting body 3A and the power supply fitting body 40 are fitted together. Therefore, in the vehicle charging system 1A according to the present embodiment, the yaw-swinging mechanism 55 rotates the power supply fitting body 40A around the shaft center 55*x* so that the end surface of the power supply fitting body 40A on the insertion direction X1 side and the end surface of the power reception fitting body 3A on the extraction direction X2 side face each other. As a result, in the vehicle charging system 1A according to the present embodiment, even when the vehicle 2 stops so that the end surface of the power supply fitting body 40A on the insertion direction X1 side is slightly inclined to the end surface of the power reception fitting body 3A on the extraction direction X2 side in the insertion-extraction direction X, the yaw-swinging mechanism 55 allows the end surface of the power supply fitting body 40A on the insertion direction X1 side and the end surface of the power reception fitting body 3A on the extraction direction X2 side to face each other, so that the power supply fitting body 40A and the power reception fitting body 3A can be fitted together.

In the above example, the power reception fitting body 3A of the vehicle charging system 1A according to the second embodiment is provided to the vehicle 2. However, the vehicle charging system 1A according to the present embodiment is not limited to this example. In another example, the power reception fitting body 3 of the vehicle charging system 1 according to the first embodiment may be provided to the vehicle 2. In this case, the power reception fitting body both side surfaces 34F1 and 34F2 include the inner surfaces of the pair of second power reception facing parts 343 and 344 and the inner surfaces (guide surfaces 351*f*1 and 351*f*2) of the pair of third power reception facing parts 351*a* and 351*b*.

In the vehicle charging system 1A according to the above embodiment, the sensor 8 is provided at each of the four corners of the upper surface 441F of the power supply fitting body 40A. However, the vehicle charging system 1A according to the present embodiment is not limited to this structure, and the number of sensors 8 to be installed on the upper surface 441F of the power supply fitting body 40A may be one, or two, three, or five or more. The positions of the sensors 8 are not limited to the four corners of the upper surface 441F of the power supply fitting body 40A, and can be modified as necessary. On the other hand, when the sensor 8 is installed at each of the four corners of the upper surface 441F of the power supply fitting body 40A, the four corners of the upper surface 441F of the power supply fitting body 40A can be brought into contact with the ceiling surface 36F, and the posture of the power supply fitting body 40A relative to the power reception fitting body 3 can be controlled more accurately.

Regarding the structures in the above embodiments, some of the structures can be combined with another one of the structures.

In the vehicle charging systems 1 and 1A described in the above embodiments, power is supplied from the charging device 49 installed outside the vehicle to the battery 22 mounted on the vehicle 2 to charge the battery 22. However, the vehicle charging systems 1 and 1A according to the above embodiments are not limited to this structure, and power may be supplied from the battery 22 mounted on the vehicle 2 to a storage battery of the charging device 49 provided outside the vehicle (for example, house) to charge the storage battery.

Furthermore, the vehicle charging systems 1 and 1A according to the above embodiments are used in the vehicle 2 that is driven and stopped by the operation of the occupant. However, the vehicle charging systems 1 and 1A according to the above embodiments are not limited to this structure, and may be used in autonomous vehicles that run and stop without requiring the driving operation of the occupant.

The power reception fitting bodies 3 and 3A in the above embodiments are installed on the vehicle 2 so that they are parallel to the horizontal plane orthogonal to the up-down direction Z. However, the power reception fitting bodies 3 and 3A according to the embodiments can be placed at an angle to the horizontal plane. This placement is based on the mounting conditions of the power reception fitting bodies 3 and 3A on the vehicle 2, variations due to assembly tolerances of the vehicle 2, road surface conditions in the stopping space 21 for the vehicle 2, positions of occupants or loads on the vehicle 2, etc.

Since the vehicle charging system according to the present embodiment has the above structure, the low-cost vehicle charging system can be provided.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle charging system comprising:
   a power supply device including a power supply fitting body and provided in a stopping space for a vehicle; and
   a power reception fitting body provided at a bottom part of the vehicle and allowing the power supply fitting body to be inserted thereinto or extracted therefrom in an insertion-extraction direction, wherein
   the power reception fitting body includes
      a power reception terminal electrically connected to a battery provided to the vehicle,
      a power reception terminal holding part that holds the power reception terminal, and
      a power reception ceiling part that includes a ceiling surface and is disposed adjacent to the power reception terminal holding part in the insertion-extraction direction,
   the power supply fitting body includes a power supply terminal electrically connected to a charging device provided outside the vehicle,
   the power supply device includes
      a moving unit that moves the power supply fitting body in the insertion-extraction direction, an up-down direction, and a lateral direction that is orthogonal to the insertion-extraction direction and the up-down direction, and
      a controller that controls movement of the power supply fitting body by the moving unit,
   the power reception fitting body includes
      a first structure extending along the lateral direction and
      a second structure related to a central position of the power reception fitting body in the lateral direction,
   the first structure and the second structure are formed protruding to one side of the up-down direction with respect to the ceiling surface,
   a distance from the second structure to the first structure in the insertion-extraction direction is set in advance,
   the power supply device includes a position detection device including a light-emitting element that emits detection light to an upward direction along the up-down direction and a light-receiving element that receives the detection light reflected on the power reception fitting body,
   the position detection device moves in linkage with the movement of the power supply fitting body by the moving unit,
   the controller
      performs fitting operation of fitting the power supply fitting body and the power reception fitting body to each other by driving the moving unit,
      causes the moving unit to move the position detection device in the insertion-extraction direction while the light-emitting element emits the detection light so as to scan the detection light in the insertion-extraction direction and detect the first structure,
      calculates a position of the second structure in the insertion-extraction direction, based on the detected first structure,
      causes the moving unit to move the position detection device to the calculated position of the second structure in the insertion-extraction direction,
      causes the moving unit to move the position detection device in the lateral direction while the light-emitting element emits the detection light so as to scan the detection light in the lateral direction and detect the second structure,
      calculates the central position of the power reception fitting body in the lateral direction, based on the detected second structure,
      makes the central position of the power supply fitting body in the lateral direction coincide with the calculated central position of the power reception fitting body in the lateral direction by driving the moving unit, and
drives the moving unit to move the power supply fitting body in the upward direction and also in an insertion direction, so that the power supply fitting body and the power reception fitting body are fitted together.

2. The vehicle charging system according to claim 1, wherein
a plurality of the first structures are arranged on the ceiling surface along the insertion-extraction direction, and
a plurality of the second structures are arranged on the ceiling surface along the lateral direction.

3. The vehicle charging system according to claim 1, wherein
the power reception terminal holding part is formed in a rectangular tubular shape,
the power reception ceiling part is formed in a thin plate shape, and
the power reception terminal holding part is the first structure.

4. The vehicle charging system according to claim 2, wherein
the power reception terminal holding part is formed in a rectangular tubular shape,
the power reception ceiling part is formed in a thin plate shape, and
the power reception terminal holding part is the first structure.

5. The vehicle charging system according to claim 1, further comprising:
a guide mechanism including a guide groove part extending in the insertion-extraction direction and a guide convex part that is engaged with the guide groove part, in which when an upper end surface of the power supply fitting body is in contact with the ceiling surface, the guide convex part is inserted to the guide groove part and, in a state where the guide convex part is inserted to the guide groove part, movement of the power supply fitting body in the lateral direction with respect to the power reception fitting body is restricted and movement of the power supply fitting body in the insertion-extraction direction with respect to the power reception fitting body is allowed, wherein
the guide groove part is provided to one of the ceiling surface and the power supply fitting body,
the guide convex part is provided to the other of the ceiling surface and the power supply fitting body, and
one of the guide groove part and the guide convex part that is formed on the ceiling surface is the second structure.

6. The vehicle charging system according to claim 2, further comprising:
a guide mechanism including a guide groove part extending in the insertion-extraction direction and a guide convex part that is engaged with the guide groove part, in which when an upper end surface of the power supply fitting body is in contact with the ceiling surface, the guide convex part is inserted to the guide groove part and, in a state where the guide convex part is inserted to the guide groove part, movement of the power supply fitting body in the lateral direction with respect to the power reception fitting body is restricted and movement of the power supply fitting body in the insertion-extraction direction with respect to the power reception fitting body is allowed, wherein
the guide groove part is provided to one of the ceiling surface and the power supply fitting body,
the guide convex part is provided to the other of the ceiling surface and the power supply fitting body, and
one of the guide groove part and the guide convex part that is formed on the ceiling surface is the second structure.

7. The vehicle charging system according to claim 3, further comprising:
a guide mechanism including a guide groove part extending in the insertion-extraction direction and a guide convex part that is engaged with the guide groove part, in which when an upper end surface of the power supply fitting body is in contact with the ceiling surface, the guide convex part is inserted to the guide groove part and, in a state where the guide convex part is inserted to the guide groove part, movement of the power supply fitting body in the lateral direction with respect to the power reception fitting body is restricted and movement of the power supply fitting body in the insertion-extraction direction with respect to the power reception fitting body is allowed, wherein
the guide groove part is provided to one of the ceiling surface and the power supply fitting body,
the guide convex part is provided to the other of the ceiling surface and the power supply fitting body, and
one of the guide groove part and the guide convex part that is formed on the ceiling surface is the second structure.

8. The vehicle charging system according to claim 1, wherein
the moving unit includes a pitch-swinging mechanism that swings the power supply fitting body around a shaft center parallel to the lateral direction,
a sensor that detects contact between an upper surface of the power supply fitting body and the ceiling surface is provided on the upper surface of the power supply fitting body, and
the controller drives the pitch-swinging mechanism in accordance with a detection result from the sensor so as to bring the upper surface of the power supply fitting body into contact with the ceiling surface.

9. The vehicle charging system according to claim 2, wherein
the moving unit includes a pitch-swinging mechanism that swings the power supply fitting body around a shaft center parallel to the lateral direction,
a sensor that detects contact between an upper surface of the power supply fitting body and the ceiling surface is provided on the upper surface of the power supply fitting body, and
the controller drives the pitch-swinging mechanism in accordance with a detection result from the sensor so as to bring the upper surface of the power supply fitting body into contact with the ceiling surface.

10. The vehicle charging system according to claim 3, wherein
the moving unit includes a pitch-swinging mechanism that swings the power supply fitting body around a shaft center parallel to the lateral direction,
a sensor that detects contact between an upper surface of the power supply fitting body and the ceiling surface is provided on the upper surface of the power supply fitting body, and
the controller drives the pitch-swinging mechanism in accordance with a detection result from the sensor so as to bring the upper surface of the power supply fitting body into contact with the ceiling surface.

11. The vehicle charging system according to claim 5, wherein
the moving unit includes a pitch-swinging mechanism that swings the power supply fitting body around a shaft center parallel to the lateral direction,
a sensor that detects contact between an upper surface of the power supply fitting body and the ceiling surface is provided on the upper surface of the power supply fitting body, and
the controller drives the pitch-swinging mechanism in accordance with a detection result from the sensor so as to bring the upper surface of the power supply fitting body into contact with the ceiling surface.

12. The vehicle charging system according to claim 1, wherein
the moving unit includes a yaw-swinging mechanism that swings the power supply fitting body around a shaft center parallel to the up-down direction, and
in a case where one of a pair of power supply fitting body both side surfaces facing each other in the lateral direction of an outer surface of the power supply fitting body is in contact with a pair of power reception fitting body both side surfaces facing each other in the lateral direction of an inner surface of the power reception fitting body, the yaw-swinging mechanism makes the power supply fitting body both side surfaces and the power reception fitting body both side surfaces face each other in the lateral direction, so that the power reception fitting body and the power supply fitting body are fitted together.

13. The vehicle charging system according to claim 2, wherein
the moving unit includes a yaw-swinging mechanism that swings the power supply fitting body around a shaft center parallel to the up-down direction, and
in a case where one of a pair of power supply fitting body both side surfaces facing each other in the lateral direction of an outer surface of the power supply fitting body is in contact with a pair of power reception fitting body both side surfaces facing each other in the lateral direction of an inner surface of the power reception fitting body, the yaw-swinging mechanism makes the power supply fitting body both side surfaces and the power reception fitting body both side surfaces face each other in the lateral direction, so that the power reception fitting body and the power supply fitting body are fitted together.

14. The vehicle charging system according to claim 3, wherein
the moving unit includes a yaw-swinging mechanism that swings the power supply fitting body around a shaft center parallel to the up-down direction, and
in a case where one of a pair of power supply fitting body both side surfaces facing each other in the lateral direction of an outer surface of the power supply fitting body is in contact with a pair of power reception fitting body both side surfaces facing each other in the lateral direction of an inner surface of the power reception fitting body, the yaw-swinging mechanism makes the power supply fitting body both side surfaces and the power reception fitting body both side surfaces face each other in the lateral direction, so that the power reception fitting body and the power supply fitting body are fitted together.

15. The vehicle charging system according to claim 5, wherein
the moving unit includes a yaw-swinging mechanism that swings the power supply fitting body around a shaft center parallel to the up-down direction, and
in a case where one of a pair of power supply fitting body both side surfaces facing each other in the lateral direction of an outer surface of the power supply fitting body is in contact with a pair of power reception fitting body both side surfaces facing each other in the lateral direction of an inner surface of the power reception fitting body, the yaw-swinging mechanism makes the power supply fitting body both side surfaces and the power reception fitting body both side surfaces face each other in the lateral direction, so that the power reception fitting body and the power supply fitting body are fitted together.

16. The vehicle charging system according to claim 8, wherein the moving unit includes a yaw-swinging mechanism that swings the power supply fitting body around a shaft center parallel to the up-down direction, and
in a case where one of a pair of power supply fitting body both side surfaces facing each other in the lateral direction of an outer surface of the power supply fitting body is in contact with a pair of power reception fitting body both side surfaces facing each other in the lateral direction of an inner surface of the power reception fitting body, the yaw-swinging mechanism makes the power supply fitting body both side surfaces and the power reception fitting body both side surfaces face each other in the lateral direction, so that the power reception fitting body and the power supply fitting body are fitted together.

17. The vehicle charging system according to claim 1, wherein
the moving unit includes an insertion-extraction-direction driving source for moving the power supply fitting body in the insertion-extraction direction, and
in a case where output of the insertion-extraction-direction driving source exceeds a predetermined threshold, the controller determines that the power reception terminal and the power supply terminal are electrically connected to each other, and stops the insertion-extraction-direction driving source.

18. The vehicle charging system according to claim 2, wherein
the moving unit includes an insertion-extraction-direction driving source for moving the power supply fitting body in the insertion-extraction direction, and
in a case where output of the insertion-extraction-direction driving source exceeds a predetermined threshold, the controller determines that the power reception terminal and the power supply terminal are electrically connected to each other, and stops the insertion-extraction-direction driving source.

19. The vehicle charging system according to claim 3, wherein
the moving unit includes an insertion-extraction-direction driving source for moving the power supply fitting body in the insertion-extraction direction, and
in a case where output of the insertion-extraction-direction driving source exceeds a predetermined threshold, the controller determines that the power reception terminal and the power supply terminal are electrically connected to each other, and stops the insertion-extraction-direction driving source.

20. The vehicle charging system according to claim 5, wherein
- the moving unit includes an insertion-extraction-direction driving source for moving the power supply fitting body in the insertion-extraction direction, and
- in a case where output of the insertion-extraction-direction driving source exceeds a predetermined threshold, the controller determines that the power reception terminal and the power supply terminal are electrically connected to each other, and stops the insertion-extraction-direction driving source.

* * * * *